(12) United States Patent
Kim et al.

(10) Patent No.: US 10,324,305 B2
(45) Date of Patent: Jun. 18, 2019

(54) DISPLAY DEVICE AND VEHICLE HAVING THE SAME

(71) Applicant: LG ELECTRONICS INC., Seoul (KR)

(72) Inventors: Sangwon Kim, Seoul (KR); Kyunglack Kim, Seoul (KR); Inkoo Shim, Seoul (KR); Byungju Lee, Seoul (KR); Youshin Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/881,380

(22) Filed: Jan. 26, 2018

(65) Prior Publication Data

US 2019/0129195 A1    May 2, 2019

(30) Foreign Application Priority Data

Oct. 26, 2017  (KR) .................. 10-2017-0140455

(51) Int. Cl.
*G02B 5/00* (2006.01)
*G02B 27/22* (2018.01)
(Continued)

(52) U.S. Cl.
CPC .......... *G02B 27/2221* (2013.01); *B60K 35/00* (2013.01); *G02B 5/003* (2013.01);
(Continued)

(58) Field of Classification Search
CPC ........... H04N 5/4403; H04N 21/42224; H04N 21/42207; H04N 21/42209;
(Continued)

(56) References Cited

U.S. PATENT DOCUMENTS 3,950,072 A    4/1976  Aten
4,961,625 A *  10/1990 Wood ................. G02B 27/01
                                                   359/630

(Continued)

FOREIGN PATENT DOCUMENTS

DE  10 2008 037 061 A1   2/2010
JP     2006-528101 A    12/2006
(Continued)

*Primary Examiner* — Shaheda A Abdin
(74) *Attorney, Agent, or Firm* — Birch, Stewart, Kolasch & Birch, LLP

(57) ABSTRACT

A display device for installation in a vehicle can include a first display configured to output first light forming first visual information; and a light synthesizing unit configured to pass the first light through the light synthesizing unit, and reflect second light and third light generated by different light sources, in which the light synthesizing unit includes a first light synthesizing portion disposed with a first surface of the first light synthesizing portion facing a first direction, and the first light synthesizing portion is configured to pass the first light through the first light synthesizing portion and reflect the second light; and a second light synthesizing portion disposed with a second surface of the second light synthesizing portion facing a second direction different from the first direction, and the second light synthesizing portion is configured to pass the first light through the second light synthesizing portion and reflect the third light.

20 Claims, 24 Drawing Sheets

(51) Int. Cl.
*G02B 27/14* (2006.01)
*G02B 7/182* (2006.01)
*G09G 5/14* (2006.01)
*B60K 35/00* (2006.01)
*G09G 3/00* (2006.01)

(52) U.S. Cl.
CPC ............ *G02B 7/182* (2013.01); *G02B 27/141* (2013.01); *G09G 3/003* (2013.01); *G09G 5/14* (2013.01); *B60K 2350/106* (2013.01); *B60K 2350/2017* (2013.01); *G09G 2380/10* (2013.01)

(58) Field of Classification Search
CPC ......... H04N 21/4222; H04N 21/42222; H04N 21/42226; H04N 21/4316; H04N 21/4325; H04N 21/4334; H04N 21/43637; H04N 21/441; H04H 60/45
See application file for complete search history.

(56) References Cited

U.S. PATENT DOCUMENTS

2002/0167817 A1* 11/2002 Tatsukawa ............... B60Q 1/12
 362/523
2002/0186228 A1 12/2002 Kobayashi et al.
2004/0227814 A1* 11/2004 Choi ........................ B60R 1/00
 348/148
2016/0266283 A1* 9/2016 Segawa ................ G02B 3/0006

FOREIGN PATENT DOCUMENTS

JP 2017-78668 A 4/2017
KR 10-2017-0111138 A 10/2017

* cited by examiner (a)

(b)

(a)

(b)

DISPLAY DEVICE AND VEHICLE HAVING THE SAME

CROSS-REFERENCE TO RELATED APPLICATION

Pursuant to 35 U.S.C. § 119(a), this application claims the benefit of an earlier filing date and priority to Korean Application No. 10-2017-0140455, filed in the Republic of Korea on Oct. 26, 2017, the contents of which are incorporated by reference herein in its entirety.

BACKGROUND OF THE INVENTION

1. Field of the Invention

The present invention relates to a display device capable of outputting driving information related to a vehicle, and a vehicle having the same.

2. Description of the Related Art

A vehicle refers to a means of transporting people or goods by using kinetic energy. Representative examples of vehicles include automobiles and motorcycles.

For safety and convenience of a user who uses the vehicle, various sensors and devices are provided in the vehicle, and functions of the vehicle are diversified.

The functions of the vehicle may be divided into a convenience function for promoting driver's convenience, and a safety function for enhancing safety of the driver and/or pedestrians.

First, the convenience function has a development motive associated with the driver's convenience, such as providing infotainment (information+entertainment) to the vehicle, supporting a partially autonomous driving function, or helping the driver ensuring a field of vision at night or at a blind spot. For example, the convenience functions may include various functions, such as an active cruise control (ACC), a smart parking assist system (SPAS), a night vision (NV), a head up display (HUD), an around view monitor (AVM), an adaptive headlight system (AHS), and the like.

The safety function is a technique of ensuring safeties of the driver and/or pedestrians, and may include various functions, such as a lane departure warning system (LDWS), a lane keeping assist system (LKAS), an autonomous emergency braking (AEB), and the like.

As the functions of the vehicle are diversified, various types of driving information are provided. The functions of the vehicle are classified into a convenience function and a safety function. Driving information for the safety function needs to be intuitively transmitted to the driver as compared with driving information for the convenience function. It is necessary to develop a display device capable of effectively transmitting various driving information according to a driving situation of the vehicle.

SUMMARY OF THE INVENTION

The present invention is directed to solving the above-mentioned problems and other drawbacks.

An aspect of the present invention is to provide a display device, capable of effectively transmitting various types of driving information, and a vehicle having the same. Specifically, the present invention provides a display device capable of generating a different sense of depth according to driving information to be displayed, and a vehicle having the same.

An aspect of the present invention is to provide a display device, capable of three-dimensionally providing driving information using not only a hardware configuration of a display but also an optical illusion effect by software, and a vehicle having the same.

The present invention relates to a display device provided in a vehicle and configured to perform communication with at least one processor provided in the vehicle.

To achieve these and other advantages and in accordance with the purpose of this specification, as embodied and broadly described herein, there is provided a display device including, a first display configured to output first light forming first visual information, and a light synthesizing unit configured to transmit the first light, and reflect second light and third light generated by different light sources, in which the light synthesizing unit includes a first light synthesizing portion disposed so that one surface thereof faces a first direction, and configured to transmit the first light and reflect the second light, and a second light synthesizing portion disposed so that one surface thereof faces a second direction different from the first direction, and configured to transmit the first light and reflect the third light.

According to one embodiment, the first light synthesizing portion may be disposed so that the first direction and a direction in which the first display faces form an acute angle, and the second light synthesizing portion may be disposed so that the second direction and a direction in which the second display faces form an acute angle.

According to one embodiment, the first direction and the second direction may form an acute angle which is the same as or smaller than a right angle.

According to one embodiment, the device may further include a light absorbing unit disposed between the first light synthesizing portion and the second light synthesizing portion and configured to absorb at least one of the second light and the third light.

According to one embodiment, the light absorbing unit may block the second light from proceeding to the second light synthesizing portion and block the third light from proceeding to the first light synthesizing portion.

According to one embodiment, the light absorbing unit may be arranged to be orthogonal to the first display, and one end of the light absorbing unit may be connected to the first display.

According to one embodiment, the device may further include a second display spaced apart from the first display to form a predetermined angle, and the second display may include a first portion for outputting the second light and a second portion for outputting the third light.

According to one embodiment, the device may further include a reflection unit configured to reflect the third light output from the second portion to be directed to the second light synthesizing portion.

According to one embodiment, the reflection unit may be formed to be tiltable so that a path of the third light is varied.

According to one embodiment, a first angle between the reflection unit and the first display may vary depending on speed of the vehicle.

According to one embodiment, the second light synthesizing portion may be configured to be tiltable so that the second direction is varied.

According to one embodiment, at least one of an output position and an output direction of the information output on the second portion may vary according to the second direction.

According to one embodiment, when a main execution screen is output on the second display in response to an event generation, the main execution screen may be divided into first and second sub execution screens on the basis of the first and second portions. Also, the first sub execution screen may be output on the first portion, and the second sub execution screen may be output on the second portion in an inverted manner.

According to one embodiment, the device may further include a communication unit configured to receive the main execution screen from at least one processor provided in the vehicle.

According to one embodiment, the device may further include a second display configured to output the second light toward one surface of the first light synthesizing portion, and a third display configured to output the third light toward one surface of the second light synthesizing portion.

According to one embodiment, the second and third displays may be spaced apart from each other in a direction facing each other.

According to one embodiment, the first light synthesizing portion may transmit the first light and reflect the second light such that the first light and the second light are directed to the same path, and the second light synthesizing portion may transmit the first light and reflect the third light such that the first light and the third light are directed to the same path.

According to one embodiment, at least one of the first and second light synthesizing portions may have transmittance variable according to a preset condition.

Further, the present invention can extend even to a vehicle having the display device and/or a method of controlling the vehicle.

Hereinafter, effects of a display device and a vehicle having the same according to the present invention will be described.

The display device can produce an effect of changing at least one of an output size and an output position of information displayed on the second display by adjusting the first angle.

According to one embodiment, when there is an object with possibility of collision, notification information for notifying the object can be provided in a two-dimensional manner through a first graphic object or in a three-dimensional manner through a second graphic object according to the possibility of collision. Furthermore, since the first angle of the light synthesizing unit varies according to the possibility of collision, the notification information can be more effectively transmitted to passengers.

According to one embodiment, the second display can be divided into a first portion and a second portion, and a first graphic object can be displayed on the first portion and a second graphic object on the second portion. The first graphic object has a first depth value by the first light synthesizing portion and the second graphic object has a second depth value by the second light synthesizing. At this time, the display device can adjust respective output positions of the first and second graphic objects so that the first and second graphic objects have the same depth value. This may allow different graphic objects having the same depth value to be displayed on upper and lower portions of the first display, respectively.

The second light reflected by the first light synthesizing portion and the third light reflected by the second light synthesizing portion can be output from one display. In this situation, although a product size may increase due to the second display and the reflection unit, the second display may serve as a shielding film for blocking external light introduced into the first display. The display device can also adjust depth of a graphic object formed by the second light synthesizing portion by tilting the reflection unit, and can provide an optimized user interface according to a vehicle driving situation using the tilting of the second light synthesizing portion.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present invention may be understood as a conception including cars, motorcycles and the like. Hereinafter, the vehicle will be described based on a car.

The vehicle according to the embodiment of the present invention may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

Figure 1:
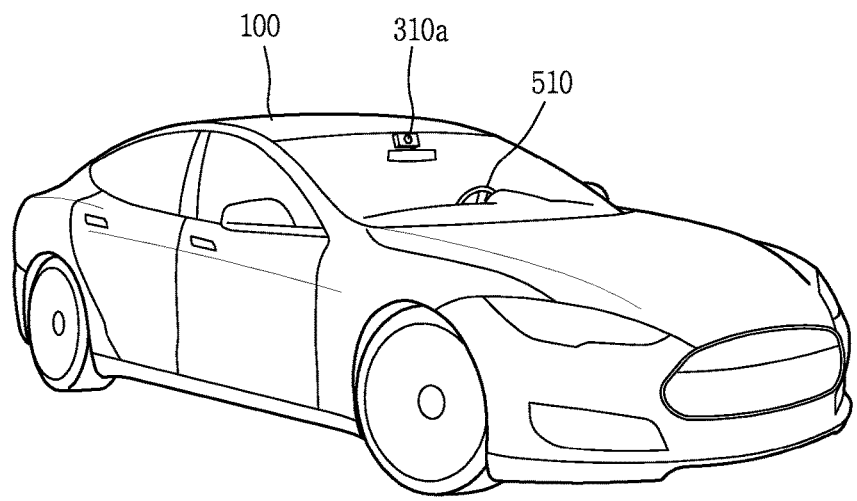
FIG. 1 is a view illustrating appearance of a vehicle in accordance with an embodiment of the present invention.
Figure 1:
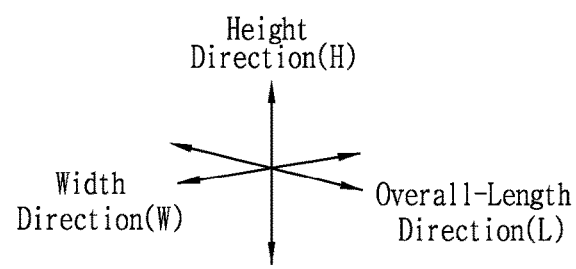

FIG. 1 is a view illustrating appearance of a vehicle in accordance with an embodiment of the present invention.

Figure 2:
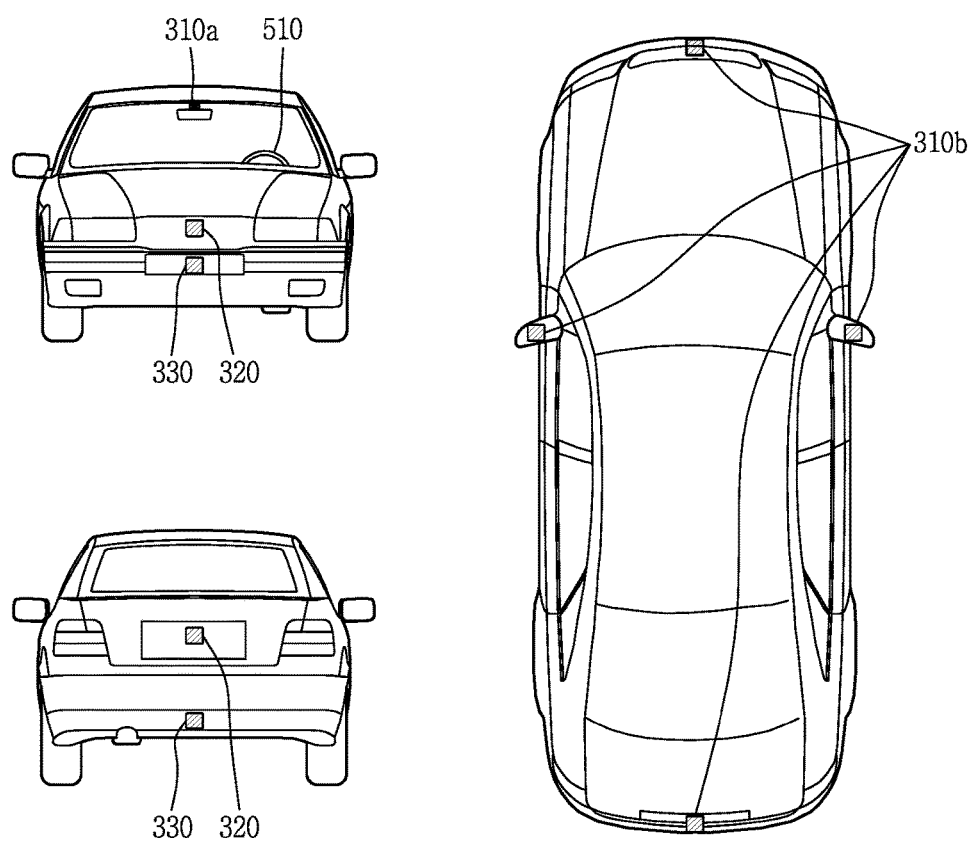
FIG. 2 is a view illustrating appearance of a vehicle at various angles in accordance with an embodiment of the present invention.

FIG. 2 is a view illustrating appearance of a vehicle at various angles in accordance with an embodiment of the present invention.

Figure 3:
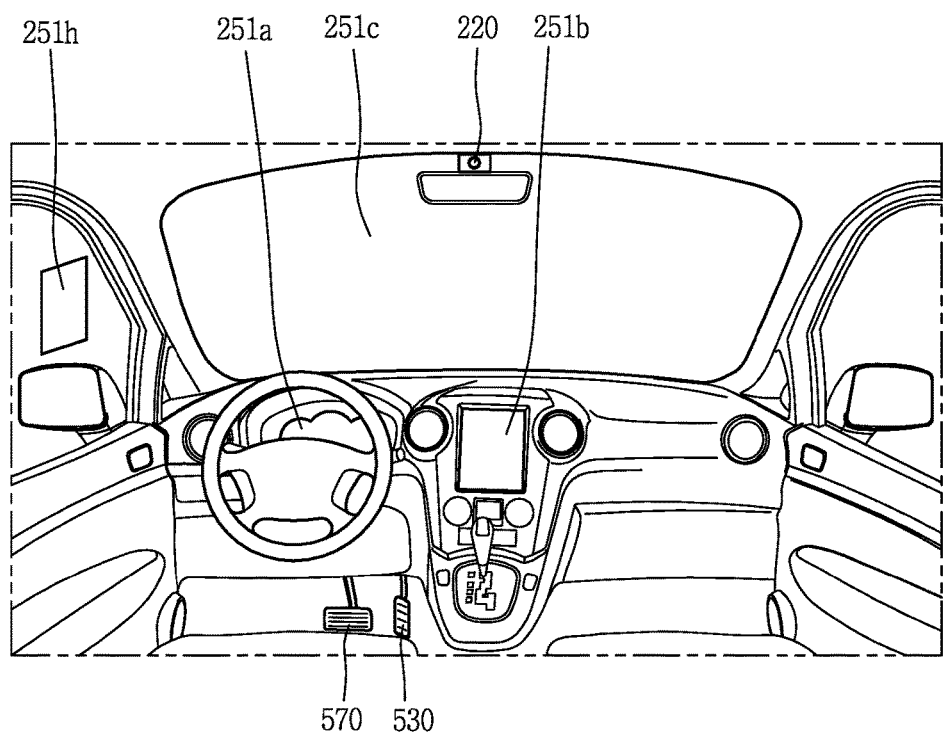
FIGS. 3 and 4 are views illustrating an inside of a vehicle in accordance with an embodiment of the present invention.
Figure 4:
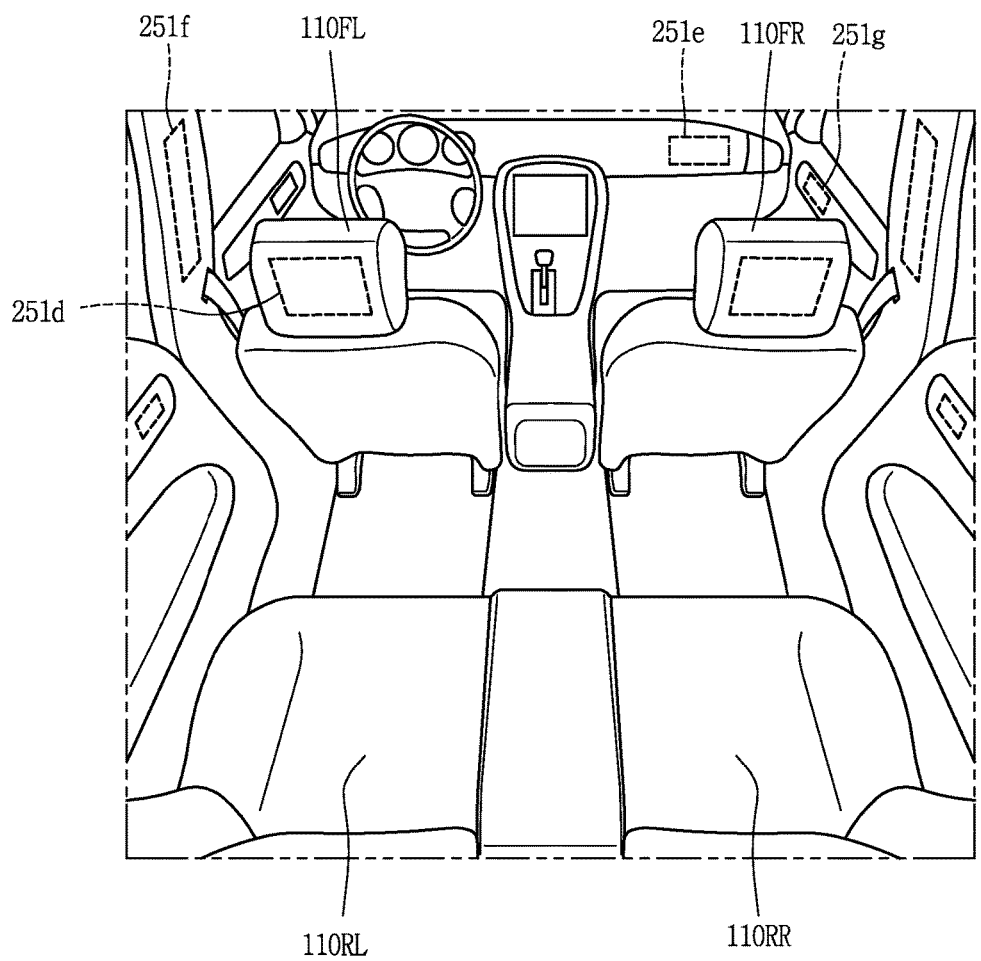

FIGS. 3 and 4 are views illustrating an inside of a vehicle in accordance with an embodiment of the present invention.

Figure 5:
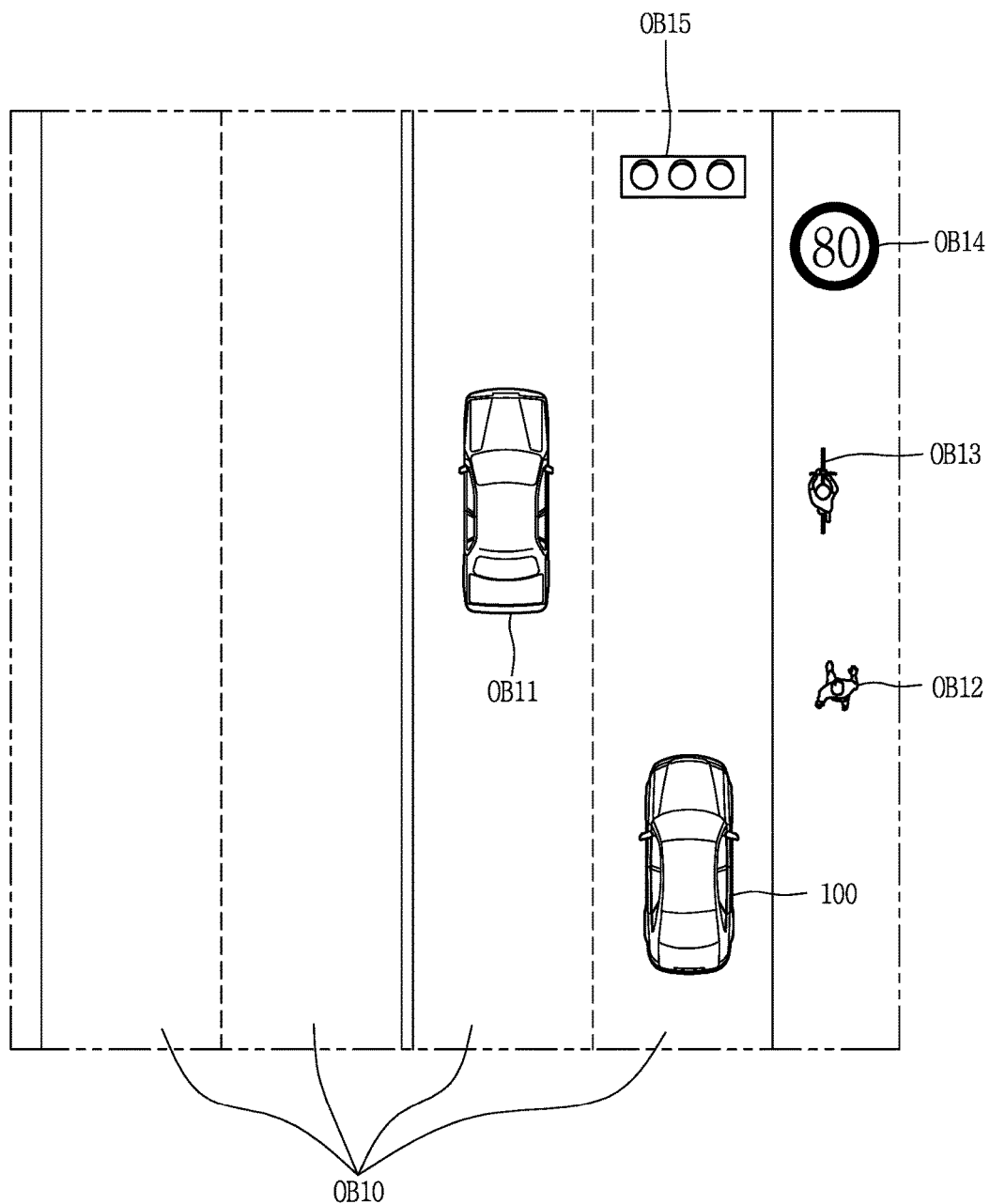
FIGS. 5 and 6 are reference views illustrating objects in accordance with an embodiment of the present invention.
Figure 6:
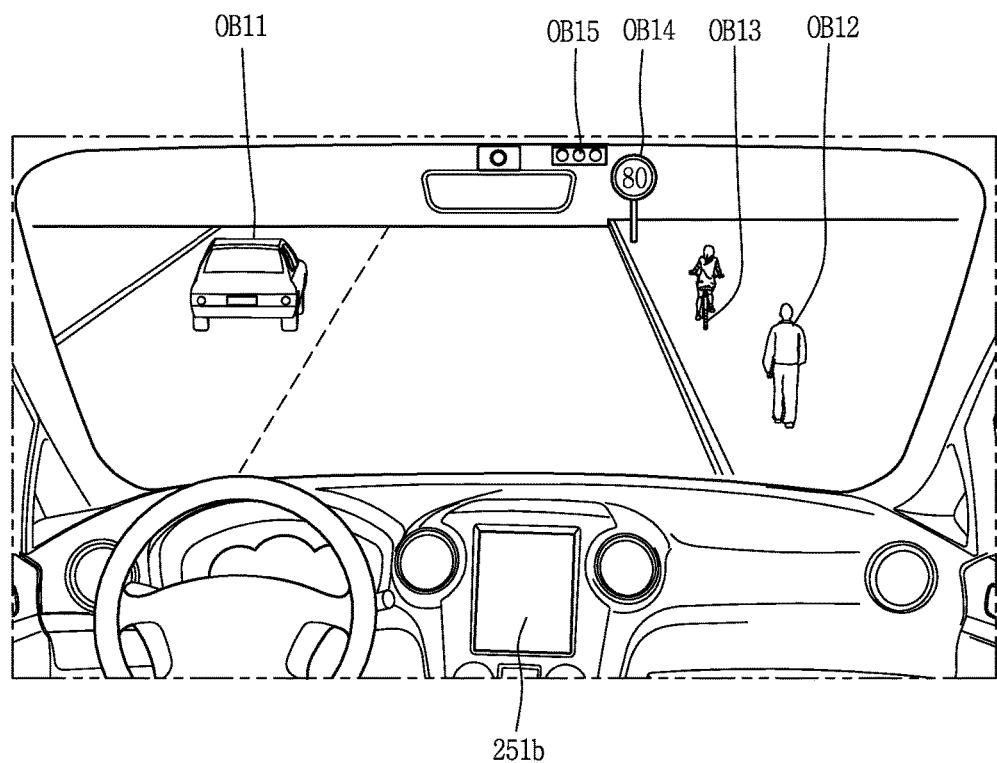

FIGS. 5 and 6 are reference views illustrating objects in accordance with an embodiment of the present invention.

Figure 7:
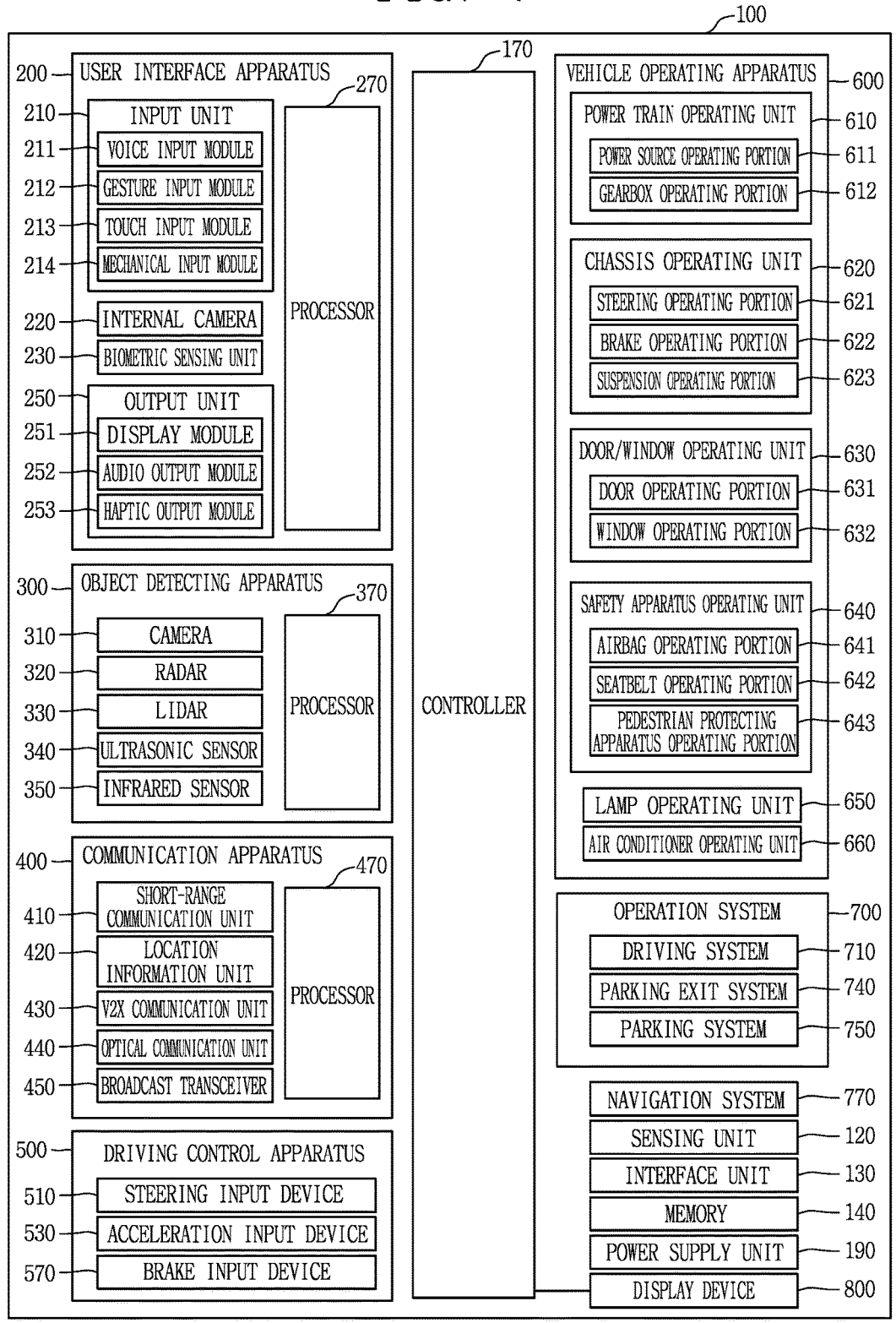
FIG. 7 is a block diagram illustrating a vehicle in accordance with an embodiment of the present invention.

FIG. 7 is a block diagram illustrating a vehicle in accordance with an embodiment of the present invention.

As illustrated in FIGS. 1 to 7, a vehicle 100 may include wheels turning by a driving force, and a steering apparatus 510 for adjusting a driving (ongoing, moving) direction of the vehicle 100.

The vehicle 100 may be an autonomous vehicle.

Here, the autonomous driving is defined as controlling at least one of acceleration, deceleration, and driving direction based on a preset algorithm. In other words, the autonomous driving refers to a driving control apparatus that is automatically manipulated even without a user input applied to the driving control apparatus.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 200 may allow the user to input information. Data collected in the input unit 200 may be analyzed by the processor 270 and processed as a user's control command.

The input unit 200 may be disposed inside the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display module 251 to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

In addition, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, or a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

In addition, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a terrain, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The terrain may include a mountain, a hill and the like.

In addition, objects may be classified into a moving object and a fixed object. For example, the moving object may be a concept including another vehicle and a pedestrian. The fixed object may be a concept including a traffic signal, a road and a structure, for example.

The object detecting apparatus 300 may include a camera 310, a radar 320, a LiDAR 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310*a*, an around view monitoring (AVM) camera 310*b* or a 360-degree camera.

For example, the camera 310 may be disposed adjacent to a front windshield within the vehicle to acquire a front image of the vehicle. Alternatively, the camera 310 may be disposed adjacent to a front bumper or a radiator grill.

For example, the camera 310 may be disposed adjacent to a rear glass within the vehicle to acquire a rear image of the vehicle. Alternatively, the camera 310 may be disposed adjacent to a rear bumper, a trunk or a tail gate.

For example, the camera 310 may be disposed adjacent to at least one of side windows within the vehicle to acquire a side image of the vehicle. Alternatively, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server. The communication device 400 may be referred to as a "wireless communication unit."

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

In addition, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touch pad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touch pad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

In addition, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

In addition, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

In addition, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

In addition, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may operate in an autonomous driving mode.

The operation system 700 may include a driving system 710, a parking exit system 740 and a parking system 750.

According to embodiments, the operation system 700 may further include other components in addition to components to be described, or may not include some of the components to be described.

In addition, the operation system 700 may include a processor. Each unit of the operation system 700 may individually include a processor.

According to embodiments, the operation system may be a sub concept of the controller 170 when it is implemented in a software configuration.

In addition, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

In addition, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Hereinafter, a display device 800 provided in the vehicle 100 will be described in detail.

The display device 800 is provided in the vehicle 100, and can be implemented as an independent device detachable from the vehicle 100 or as a part of the vehicle 100 which is integrally installed in the vehicle 100. The display device may refer to the display module 251 described above with reference to FIG. 7.

Hereinafter, for the sake of explanation, description will be given of an example that the display device 800 is a separate component independent of the display module 251 of the vehicle 100. However, this is only an embodiment of the present invention, and all the operation and control method of the display device 800 described in this specification may alternatively be performed by the controller 170 of the vehicle 100. That is, the operation and/or control method performed by a processor 860 of the display device 800 may be performed by the controller 170 of the vehicle 100.

The present invention will illustrate an example in which the display device 800 is a cluster that is disposed at a driver's seat and provides various types of vehicle driving information (or vehicle travel information) to the driver. However, the present invention is not limited thereto. For example, the display device 800 may be disposed at various locations within the vehicle 100 to provide various types of information.

Figure 8A:
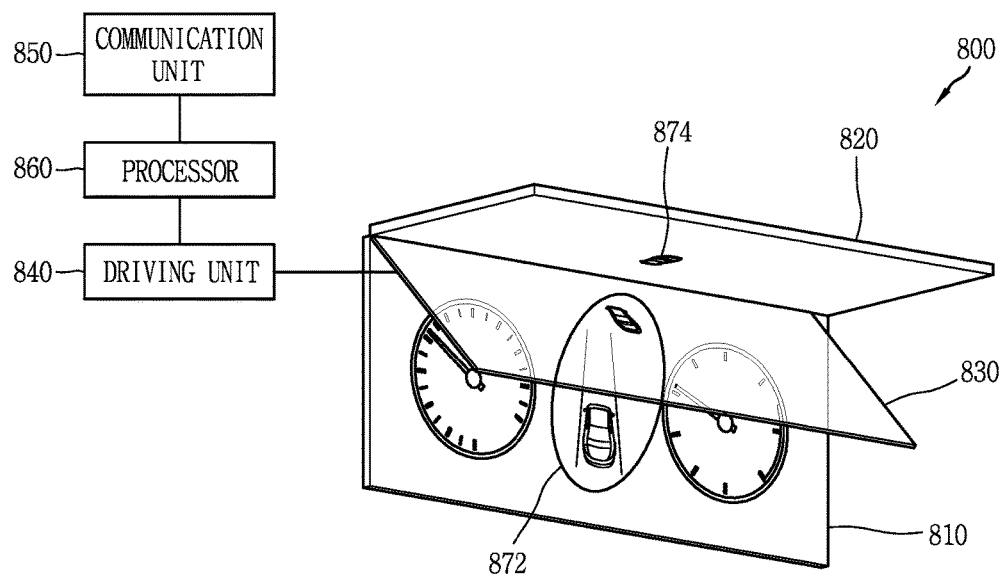
FIG. 8A is a block diagram illustrating a display device according to one embodiment of the present invention.
Figure 8B:
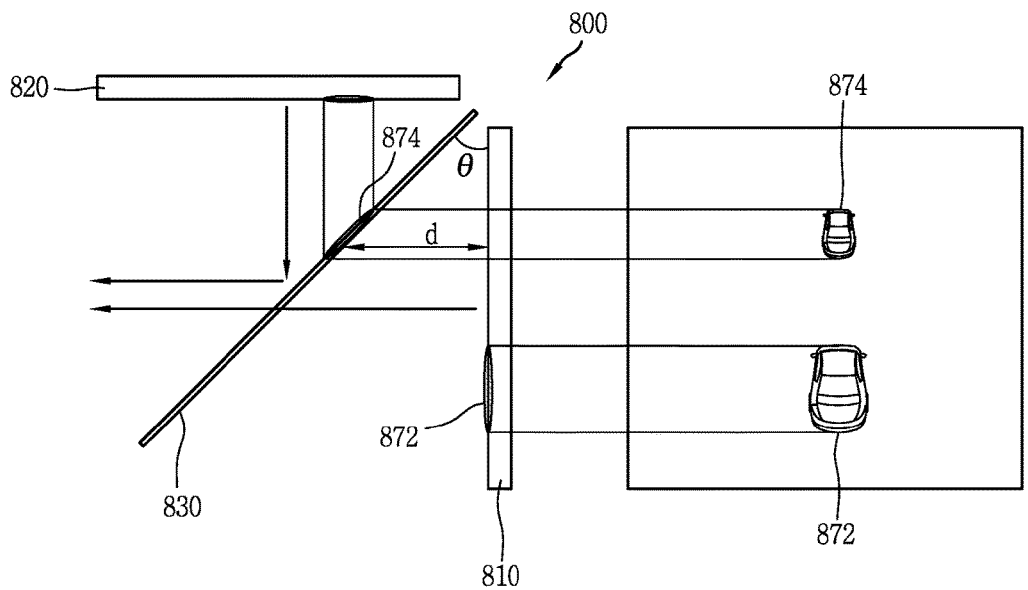
FIG. 8B is a side view and a front view of the display device of FIG. 8A.

FIG. 8A is a conceptual view illustrating a display device according to one embodiment of the present invention, and FIG. 8B is a side view and a front view of the display device 800 of FIG. 8A.

Referring to FIG. 8A, the display device 800 can include at least one of a communication unit 850, a first display 810, a second display 820, a light synthesizing unit 830, a processor 860, and a driving unit 840.

The communication unit 850 is configured to perform communication with the various components described in FIG. 7. For example, the communication unit 850 can receive various information provided through a controller area network (CAN). In another example, the communication unit 850 can perform communication with all devices capable of performing communication, such as a vehicle, a mobile terminal, a server, and another vehicle. This may be referred to as Vehicle to everything (V2X) communication. The V2X communication may be defined as a technology of exchanging or sharing information, such as traffic condition and the like, while communicating with a road infrastructure and other vehicles during driving.

The communication unit 850 can receive information related to the driving of the vehicle from most of devices provided in the vehicle 100. The information transmitted from the vehicle 100 to the display device 800 is referred to as "vehicle driving information (or vehicle travel information)."

The vehicle driving information includes vehicle information and surrounding information related to the vehicle. Information related to the inside of the vehicle based on the frame of the vehicle 100 may be defined as the vehicle information, and information related to the outside of the vehicle may be defined as the surrounding information.

The vehicle information refers to information related to the vehicle itself. For example, the vehicle information can include a driving speed, a driving direction, an acceleration, an angular velocity, a location (GPS), a weight, a number of passengers in the vehicle, a braking force of the vehicle, a maximum braking force, air pressure of each wheel, a centrifugal force applied to the vehicle, a driving mode of the vehicle (autonomous driving mode or manual driving mode), a parking mode of the vehicle (autonomous parting mode, automatic parking mode, manual parking mode), whether or not a user is present in the vehicle, and information associated with the user.

The surrounding information refers to information related to another object located within a predetermined range around the vehicle, and information related to the outside of the vehicle. The surrounding information of the vehicle can be a state of a road surface on which the vehicle is traveling (e.g., a frictional force), the weather, a distance from a front-side (rear-side) vehicle, a relative speed of a front-side (rear-side) vehicle, a curvature of a curve when a driving lane is the curve, information associated with an object existing in a reference region (predetermined region) based on the vehicle, whether or not an object enters (or leaves) the predetermined region, whether or not the user exists near the vehicle, information associated with the user (for example, whether or not the user is an authenticated user), and the like.

The surrounding information can include ambient brightness, temperature, a position of the sun, information related to nearby subject (a person, another vehicle, a sign, etc.), a type of a driving road surface, a landmark, line information, and driving lane information, and information required for an autonomous driving/autonomous parking/automatic parking/manual parking mode.

In addition, the surrounding information can further include a distance from an object existing around the vehicle to the vehicle 100, possibility of collision, a type of an object, a parking space for the vehicle, an object for identifying the parking space (for example, a parking line, a string, another vehicle, a wall, etc.), and the like.

The vehicle driving information is not limited to the example described above and can include all information generated from the components provided in the vehicle 100.

The first and second displays 810 and 820 may output various information under the control of the processor 860 provided in the display device 800. For example, the first display 810 may output first light that forms first visual information, and the second display 820 may output second light that forms second visual information. The first and second visual information may relate to the aforementioned vehicle driving information.

The displays 810 and 820 may include at least one of a liquid crystal display (LCD), a thin film transistor-LCD (TFT LCD), an organic light-emitting diode (OLED), a flexible display, a three-dimensional (3D) display, and an e-ink display.

The first display 810 can be oriented toward a first direction and the second display 820 can be oriented toward a second direction that is perpendicular to the first direction. The second direction can indicate a direction forming an angle of a predetermined range approximately perpendicular to the first direction.

The first direction can be a direction facing driver's eyes when the driver is seated in the driver's seat, and the second direction can be a direction having a predetermined first angle with respect to the first direction. In one example, the second direction can be a gravitational direction (e.g., pointing towards the ground).

According to the arrangement of the first and second displays 810 and 820, the first display 810 enters the driver's view but the second display 820 is out of the driver's view when the driver is seated in the driver's seat.

The light synthesizing unit 830 is located on an advancing path of each of the first light and the second light. Specifically, the light synthesizing unit 830 forms a first acute angle with the first display 810 and a second acute angle with the second display 820. The first acute angle and the second acute angle can be the same angle or different angles.

One end of the light synthesizing unit 830 can be located adjacent to the first and second displays 810 and 820. The light synthesizing unit 830 can be arranged between the first and second displays 810 and 820 in a manner of getting farther away from the first and second displays 810 and 820 from one end of the light synthesizing unit 830 toward another end of the light synthesizing unit 830.

The light synthesizing unit 830 allows the first light to transmit therethrough and reflect the second light between the first and second displays 810 and 820 so that the first light and the second light are directed to the same path (e.g., towards the driver's eyes). In other words, the light synthesizing unit 830 synthesizes the first light and the second light so that the first light and the second light can be directed to the same optical path.

The light synthesizing unit 830 can be a mirror such as a dichroic mirror.

The second light generated in the second display 820 arranged to face the second direction is synthesized with the first light by the light synthesizing unit 830 to form synthesized light, which proceeds toward the first direction.

For example, as illustrated in FIG. 8A, a first graphic object 872 can be output on the first display 810, and a second graphic object 874 can be output on the second display 820.

The first light corresponding to the first graphic object 872 is transmitted through the light synthesizing unit 830 without being reflected by the light synthesizing unit 830, to be intuitively perceived or recognized as being output from the first display 810. This is because the light synthesizing unit 830 is made transparent.

On the other hand, since the second light corresponding to the second graphic object 874 is reflected by the light synthesizing unit 830, the user may recognize that the second visual information is being displayed on the light synthesizing unit 830.

Referring to FIG. 8B, the user recognizes that the first graphic object 872 is located on the first display 810 and the second graphic object 874 is located on the light synthesizing unit 830. Accordingly, the first and second graphic objects 872 and 874 may have a distance therebetween as far as a distance d between the light synthesizing unit 830 and the first display 810.

The user may perceive the first and second graphic objects 872 and 874 as the second graphic object 874 is located above the first graphic object 872. The user may perceive the first and second graphic objects 872 and 874 as the second graphic object 874 is located closer to him/her than the first graphic object 872, or the first graphic object 872 is located farther away from him/her than the second graphic object 874. That is, the user can feel three-dimensional (3D) depth due to the difference in position between the light synthesizing unit 830 and the first display 810.

Information output on each display can obtain 3D depth when the first visual information is displayed on the first display 810 and the second visual information is displayed on the second display 820 at the same time.

Here, "sense of depth" or "depth value" refers to an index indicating a difference in distance between a virtual one point and an object displayed on the display device 800. A depth value of an object can be defined as "0" when the object displayed on the display device 800 is located at a predetermined point. A depth value of an object which seems to have a shape protruding from the predetermined point to outside of the display device 800 may be defined as a negative value, and a depth value of an object which seems to have an inwardly concave (recessed) shape may be defined as a positive value. It may be construed that the object is farther away from the predetermined point when an absolute value of the depth value is larger.

The depth value disclosed in the present invention is generated by the distance difference between the first display and the light synthesizing unit and can be defined as a perpendicular distance from a reference surface to the light synthesizing unit when the first display is used as the reference surface.

Although the same graphic object is displayed in the same size, it can have a different depth value according to an output position on the second display 820. This is because the light synthesizing unit 830 is positioned between the first and second displays 810 and 820 and one surface of the light synthesizing unit 830 forms a first angle θ with the first display 810.

Hereinafter, the angle between the light synthesizing unit 830 and the first display 810 is defined as a "first angle."

If no information is displayed on the second display 820, the user is provided with information displayed on the first display 810 in a two-dimensional (2D) form.

On the other hand, when information is displayed on the second display 820, all information displayed on the first and second displays 810 and 820 can be provided in a three-dimensional (3D) form. Due to the difference in position between the light synthesizing unit 830 and the first display 810, the information displayed on the second display 820 has a different depth value depending on its output position.

The processor 860 is configured to control at least one of the first and second displays 810 and 820.

Specifically, the processor 860 can determine whether or not at least one of a plurality of preset conditions is satisfied, based on vehicle driving information received through the communication unit 850. The processor 860 can control at least one of the first and second displays 810 and 820 in a different way, to output information corresponding to the satisfied condition.

In connection with the preset conditions, the processor 860 can detect an occurrence of an event in an electric component and/or application provided in the vehicle 100, and determine whether the detected event meets the preset condition. At this time, the processor 860 can detect the occurrence of the event from the information received through the communication unit 810.

The application is a concept including a widget, a home launcher, and the like, and refers to all types of programs that can be run on the vehicle 100. Accordingly, the application may be a program that performs a function of a web browser, a video playback, a message transmission/reception, a schedule management, or an application update.

Further, the application can include a forward collision warning (FCW), a blind spot detection (BSD), a lane departure warning (LDW), a pedestrian detection (PD) A Curve Speed Warning (CSW), and a turn-by-turn navigation (TBT).

For example, the event occurrence can be a missed call, presence of an application to be updated, a message arrival, start on, start off, autonomous driving on/off, pressing of an LCD awake key, an alarm, an incoming call, a missed notification, and the like.

As another example, the occurrence of the event can be a generation of an alert set in the advanced driver assistance system (ADAS), or an execution of a function set in the ADAS. For example, the occurrence of the event can be a generation of forward collision warning, a generation of a blind spot detection, a generation of lane departure warning, a generation of lane keeping assist warning, or an execution of autonomous emergency braking.

As another example, the occurrence of the event may also be a change from a forward gear to a reverse gear, an occurrence of an acceleration greater than a predetermined value, an occurrence of a deceleration greater than a predetermined value, a change of a power device from an internal combustion engine to a motor, or a change from the motor to the internal combustion engine.

In addition, even when various ECUs provided in the vehicle 100 perform specific functions, it may be determined as the occurrence of the event.

When the occurred event satisfies a preset condition, the processor 860 controls the first display 810 and/or the second display 820 to output information corresponding to the satisfied condition.

When an event occurs, information related to the occurred event needs to be provided to the passenger of the vehicle 100. At this time, the information displayed on the first display 810 and the information displayed on the second display 820 are distinguished from each other.

For example, general information to be provided to a passenger may be displayed on the first display 810 as main information, and sub information for emphasizing the main information may be displayed on the second display 820.

In another example, the first display 810 can output the vehicle driving information, and the second display 820 can output a graphical object associated with the vehicle driving information.

In another example, when a preset condition is satisfied while predetermined visual information is output on the first display 810, the processor 860 can move the predetermined visual information to the second display 820. In other words, the predetermined visual information which is being output on the first display 810 can disappear from the first display 810 and then output on the second display 820.

The processor 860 can display a graphic object corresponding to the vehicle driving information on the second display 820.

The graphic object corresponding to the vehicle driving information is for emphasizing information displayed on the first display 810, and may differ according to the information displayed on the first display 810. As another example, the graphic object may become (change to) a different graphic object depending on a type of event occurred. Here, the different graphic object, for example, may refer to an image having a different shape, length, color, or the like.

The type of the graphic object displayed on the second display 820 can vary according to the vehicle driving information displayed on the first display 820.

An output position of the graphic object on the second display 820 can vary depending on a driving situation of the vehicle. Here, the driving situation can relate to at least one of a position, acceleration, a running speed, and a running direction of the vehicle 100, and collision possibility with an external object.

Since the vehicle is premised on movement, information provided in the vehicle has its own position data. For example, route guidance information has position data of a point for which a route guidance should be provided, and object information having possibility of collision has position data of a point where the object is located.

When displaying information with position data, it is important to effectively inform a passenger of a point corresponding to the position data. The display device 800 according to the present invention can effectively guide the point using the light synthesizing unit 830, which is disposed tilted to have a predetermined angle with respect to the first display 810.

Specifically, the processor 860 of the display device 800 can adjust the output position of the information to have a different depth value depending on how far the point is away from the vehicle 100. This is because even the same information has a different depth value according to where (on which point) it is output on the second display 820.

For example, when the point is located within a first distance range, information to guide the point is output at a position away from one end of the second display 820 by a first distance. On the other hand, when the point is located within a second distance range, the information to guide the point may be output at a position away from the one end of the second display 820 by a second distance farther than the first distance. The passenger intuitively recognizes how far the point is located since the depth value differs according to the output position.

Hereinafter, various embodiments in which the processor 860 outputs information having 3D depth using the second display 820 will be described with reference to the accompanying drawings.

Figure 8C:
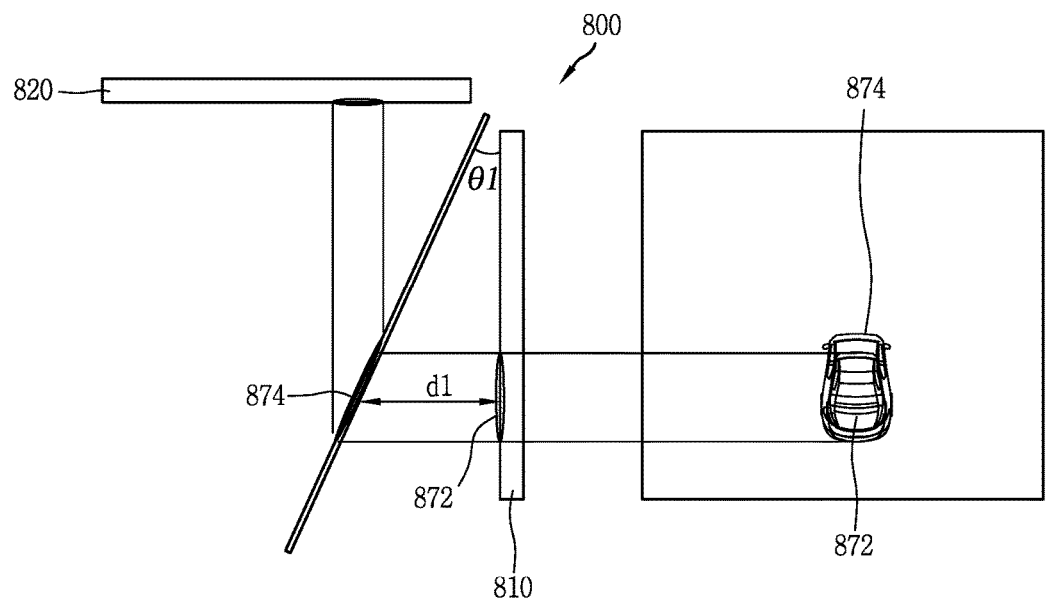
FIG. 8C is an exemplary view illustrating a change in three-dimensional depth according to tilting of a light synthesizing unit in accordance with an embodiment of the present invention.
Figure 8C:
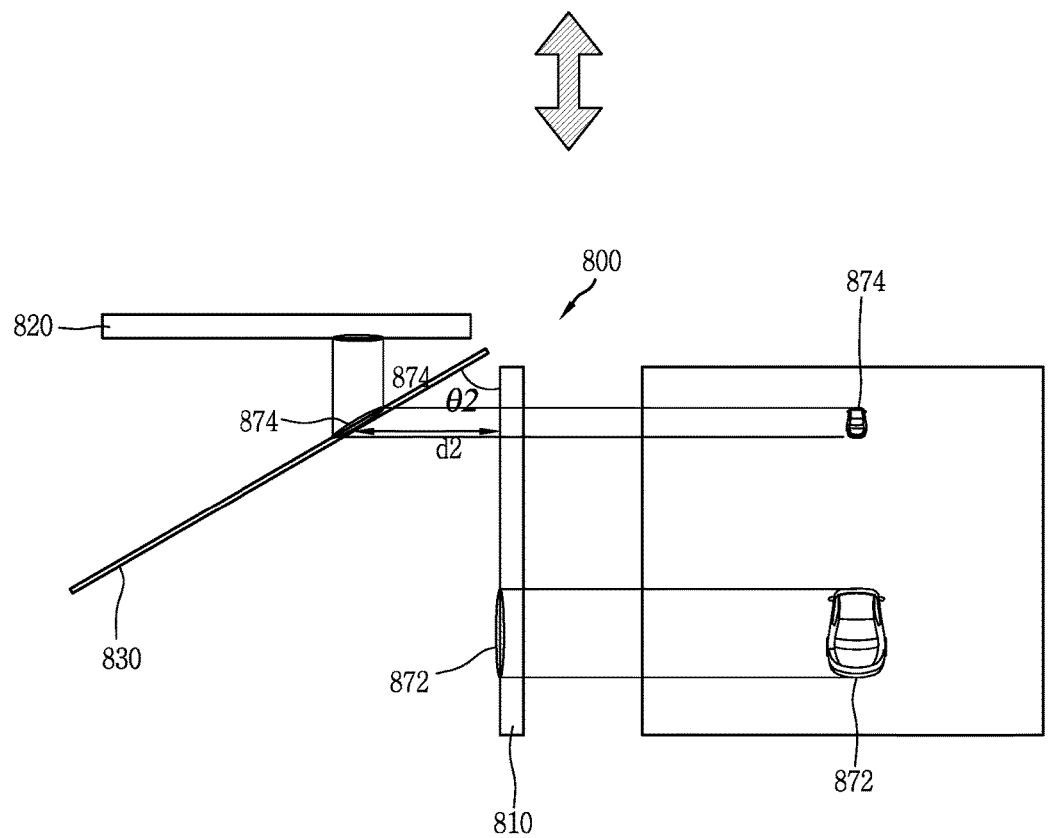

In addition, FIG. 8C is an exemplary view illustrating a change in 3D depth according to tilting of the light synthesizing unit.

In the display device 800 according to the present invention, the light synthesizing unit 830 can be tilted so that the first angle between the light synthesizing unit 830 and the first display 810 varies.

The driving unit 840 can include a rotation axis for providing power and the light synthesizing unit 830 can be coupled to the rotation axis to be tilted between the first and second displays 810 and 820.

More specifically, the processor 860 controls the driving unit 840 such that the first angle is varied to a predetermined angle corresponding to a preset condition in response to the preset condition being satisfied.

Specifically, when a preset condition is satisfied based on vehicle driving information received through the communication unit 850, the processor 860 can control the driving unit 840 accordingly.

As the driving unit 840 is driven, the light synthesizing unit 830 rotates and accordingly the first angle between the light synthesizing unit 830 and the first display 810 changes according to the rotation.

In addition, even when the same graphic object is output on the second display 820, at least one of an output position and an output size of the graphic object recognized by the user is varied according to the first angle.

Here, the output position and the output size indicate the position and size displayed on the second display 820. On the other hand, information output on the second display 820 has an effect of being output on the first display 810 by being reflected by the light synthesizing unit 830. Thus, the output position and the output size may refer to a position and size on the first display 810 recognized by the user.

That is, even if the output position and the output size are the same, at least one of the output position and the output size can vary according to the first angle.

For example, as illustrated in FIG. 8C, the first graphic object 872 can be output on the first display 810, and the second graphic object 874 can be output on the second display 820.

The first and second graphic objects 872 and 874 can overlap each other at the first angle θ1. In this situation, when the output size of the second graphic object 874 is defined as a first size, the second graphic object 874 has a first depth value d1.

On the other hand, the first and second graphic objects 872 and 874 can be output at different positions at a second angle θ2. At this time, the output size of the second graphic object 874 can be a second size, and the second graphic object 874 can have a second depth value d2.

The processor 860 can adjust the first angle to produce an effect of changing at least one of the output size and the output position of the information output on the second display 820. For example, when the tilt angle of the light synthesizing unit 830 is changed from the second angle θ2 to the first angle θ1, an effect that the second graphic object 874 gradually moves toward the first graphic object 872 is generated. Since the depth of the second graphic object 874 varies accordingly, a stereoscopic effect is generated.

The processor 860 can change the first angle according to the vehicle driving information.

In this situation, the output position and the output size of the second graphic object 874 can change according to the first angle, in order to change only the 3D depth value of the second graphic object 874 in a state where the output position of the second graphic object 874 output on the second display 820 is fixed on the first display 810.

In order to generate various effects, at least one of the output position and the output size of the second graphic object 874 can also be changed at the same time of changing the first angle.

Accordingly, the processor can change at least one of the output size and the output position of the information currently output on the second display 820 by varying the first angle while maintaining the information.

Also, at least one of the output size and the output position of the information currently output on the second display 820 can be changed while maintaining the first angle.

In addition, at least one of the output size and the output position of the information currently output on the second display 820 can be changed while varying the first angle.

By the operation of the processor 860, various types of information can be output in a 3D manner having different depth values. The display device 800 according to the present invention can provide 3D vehicle driving information to a passenger according to one of various embodiments.

Hereinafter, the control method of the processor 860 will be described in more detail based on the structure of the display device 800, with reference to the accompanying drawings.

Figure 9:
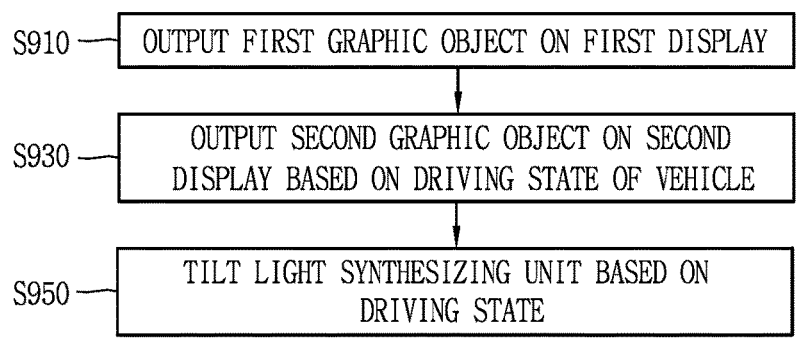
FIG. 9 is a flowchart illustrating a method of controlling a display device in accordance with an embodiment of the present invention.

FIG. 9 is a flowchart illustrating a method of controlling a display device according to an embodiment of the present invention.

First visual information can be displayed on the first display 810 according to vehicle driving information. For example, the first visual information may include a speedometer, an odometer, a tachometer, various warning lights, turn signal indicators, a fuel meter, event information for guiding an event occurring in the vehicle 100, and the like.

The second display 820 can be selectively turned on/off even when the first display 810 is turned on. For example, when a stereoscopic display mode is turned off in the vehicle 100, the second display 820 may be kept off. In another example, even when the stereoscopic display mode is turned on, the second display 820 may be kept off when there is no information to be provided to a passenger in a 3D manner.

Here, the stereoscopic display mode is defined as a state in which different types of information have different depth values and are output in a 3D manner through the light synthesizing unit 830 in a way of simultaneously outputting the different types of information on the first and second displays 810 and 820.

The light synthesizing unit 830 is formed to be tiltable, but can operate differently depending on whether the stereoscopic display mode is on or off. For example, when the stereoscopic display mode is turned on, the light synthesizing unit 830 is tilted in response to a preset condition being satisfied. However, when the stereoscopic display mode is turned off, the light synthesizing unit 830 is not tilted even when the preset condition is satisfied. The processor 860 controls the driving unit such that the light synthesizing unit 830 is not tilted even though the preset condition is satisfied when the stereoscopic display mode is turned off in the vehicle 100.

When the second display 820 is turned off, the light synthesizing unit 830 can be tilted such that the first angle has an initial setting value.

The second display 820 can output, as second visual information, information for emphasizing at least part of the first visual information displayed on the first display 810 and/or predetermined information to be guided to a passenger in a 3D manner regardless of the first visual information.

Various types of visual information can be displayed on the first and second displays 810 and 820. However, for convenience of explanation, the display device 800 according to the present invention will be described based on an example in which a first graphic object is displayed on the first display 810 and a second graphic object is displayed on the second display 820. However, the present invention is not limited to the first and second graphic objects, and a plurality of graphic objects can alternatively be displayed on or disappear from at least one of the first and second displays 810 and 820 according to the control of the processor 860.

First, the processor 860 outputs the first graphic object on the first display 810 (S910).

Figure 10:
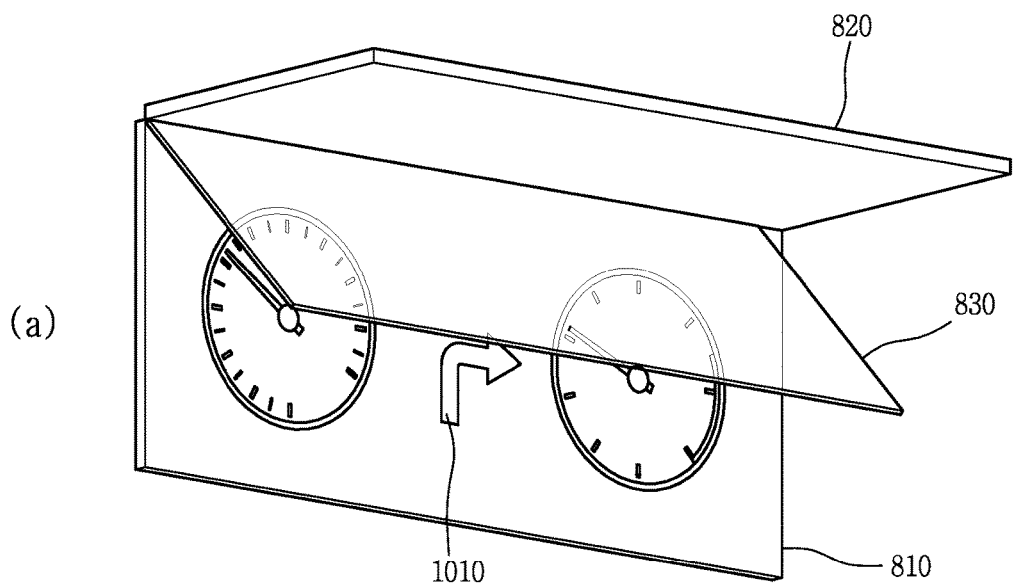
FIGS. 10 to 12 are exemplary views illustrating operations of the display device according to the control method of FIG. 9 in accordance with an embodiment of the present invention.
Figure 10:
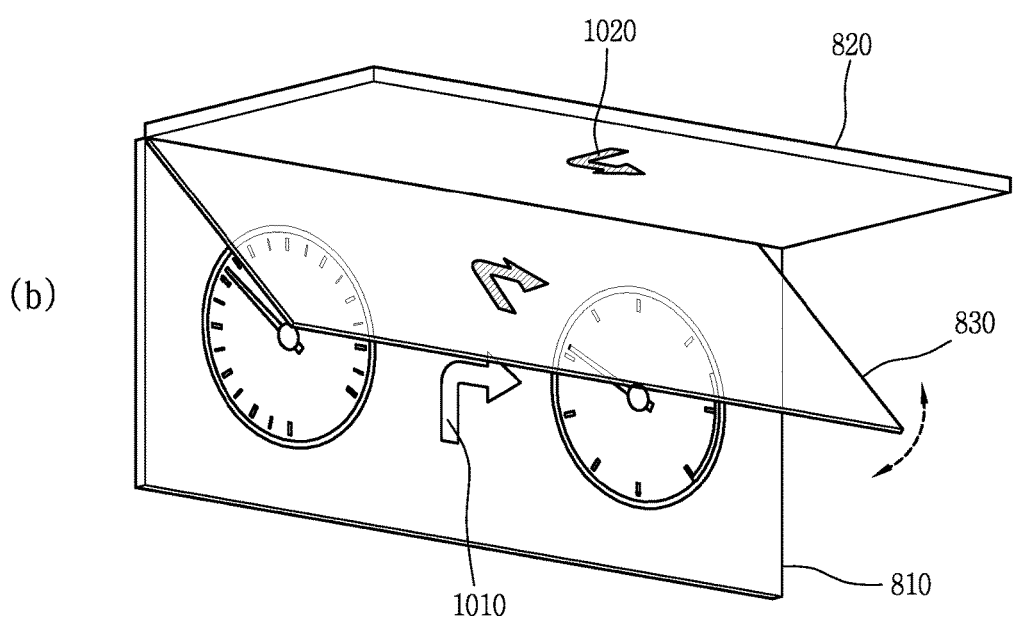

For example, as illustrated in FIG. 10, direction guidance information 1010 for guiding a route to a destination can be output on the first display 810 in a turn by turn (TBT) manner. The direction guidance information 1010 can be the first graphic object.

Figure 11:
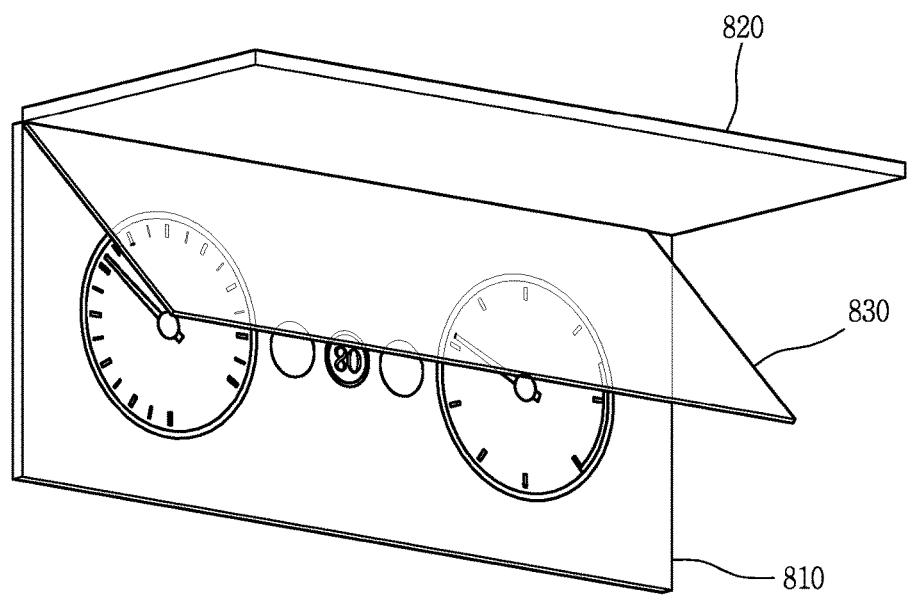
Figure 11:
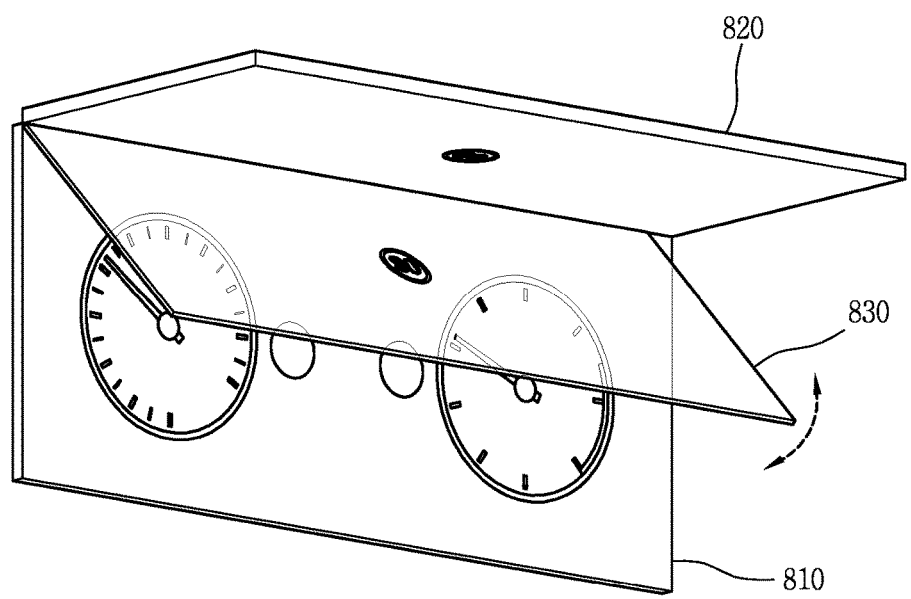
Figure 12:
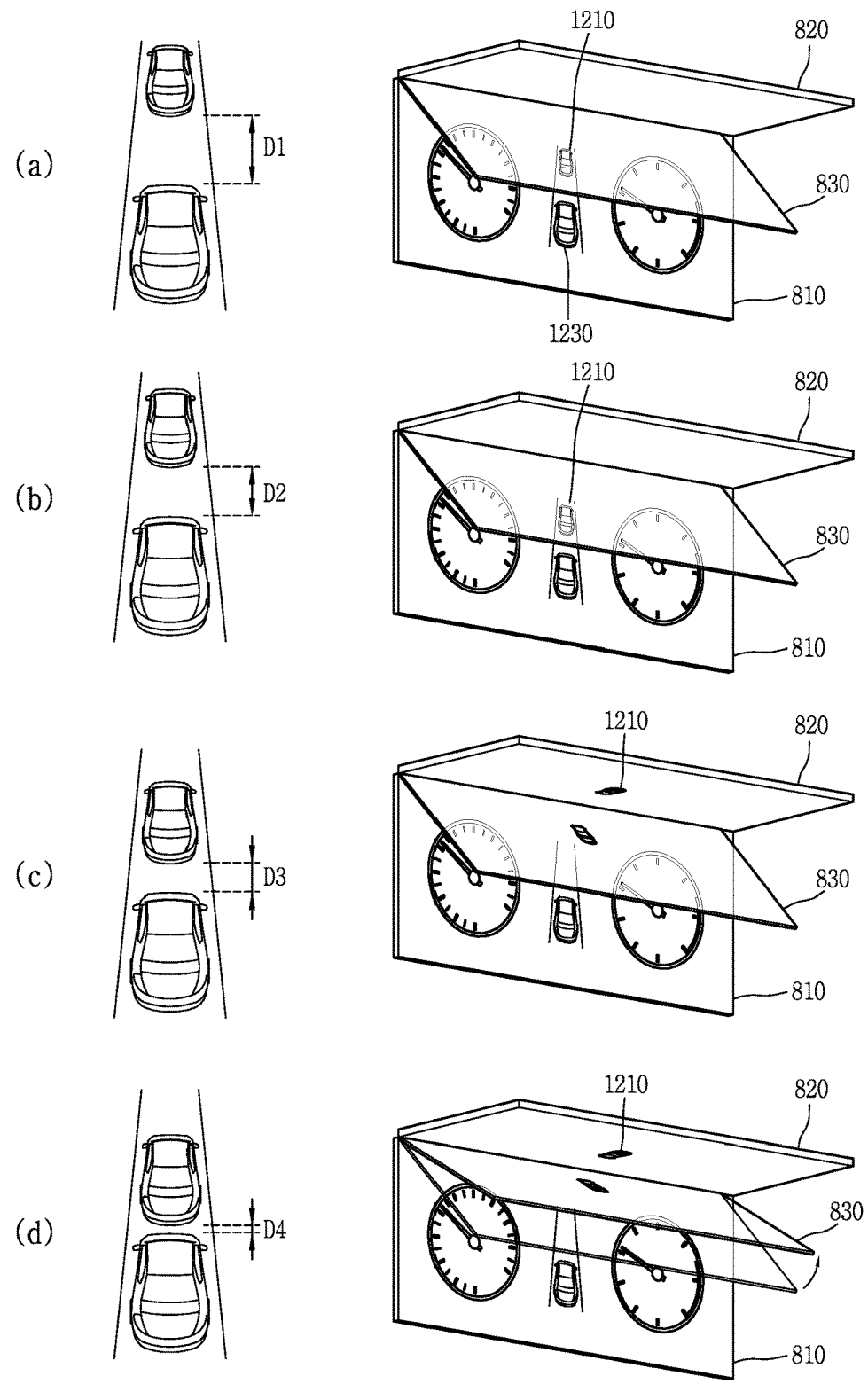

As another example, the first graphic object can be speed limit information 1110 for guiding the speed limit of a currently-traveling road as illustrated in FIG. 11, or object information 1210 for guiding an object with possibility of collision as illustrated in FIG. 12.

Next, the processor 860 displays the second graphic object on the second display 820 based on a traveling state (driving state or running state) of the vehicle 100 (S930).

The processor 860 controls the second display 820 such that the second graphic object corresponding to the first graphic object is output on the second display 820 when a preset condition is satisfied while the first graphic object is output on the first display 810.

The preset condition can be variously set, and the display device 800 can further include a memory for storing such various preset conditions.

The processor 860 can determine whether at least one of the preset conditions is satisfied according to the running state of the vehicle 100, and determine a type of the second graphic object to be output and whether or not to display the second graphic object.

The processor 860 may determine the running state of the vehicle based on vehicle driving information received through the communication unit 850. That is, the second graphic object to be displayed on the second display 820 may be selected based on the vehicle driving information.

For example, as illustrated in FIG. 10, when a point at which the vehicle 100 should change a direction (or a point at which the driver should pay attention) is located within a first reference distance range, the first graphic object 1010 can be output on the first display 810. Thereafter, when the point is located within a second reference distance range due to the movement of the vehicle 100, a second graphic object 1020 corresponding to the first graphic object 1010 can be output on the second display 820. Since the second graphic object 1020 is output in a manner of overlapping the first graphic object 1010, the passenger confirms a short distance left up to the point.

As another example, as illustrated in FIG. 11, when the vehicle 100 enters a road for which a speed limit is set or enters a speed enforcement zone in which the speed limit is cracked down, the first graphic object 1110 can be output on the first display 810. Further, when a current speed of the vehicle 100 is faster than the speed limit, the second graphic object 1020 can be output on the second display 820 to guide or slow down the current speed.

When the second graphic object 1120 is output on the second display 820, the first graphic object 1110 output on the first display 810 can disappear from the first display 810, thereby producing an effect that the first graphic object 1110 pops out from the back to the front. Alternatively, an overlapping effect for emphasizing specific information can also be produced by simultaneously outputting the first and second graphic objects 1110 and 1120 on the first and second displays 810 and 820, respectively.

Next, the processor 860 can tilt the light synthesizing unit 830 based on the running state (or the vehicle driving information). In more detail, the processor 860 can control the driving unit 840 to vary the first angle.

As the light synthesizing unit 830 is tilted, a distance between one point of the light synthesizing unit 830 and the first display 810 is changed and accordingly a depth value of the second graphic object output on the second display 820 is changed. In other words, the processor 860 can adjust the depth value for the second graphic object by controlling the driving unit 840. The passenger can feel the effect that the second graphic object approaches or gets away from him/her as the first angle is changed.

For example, referring to FIG. 10, before the second graphic object 1020 is output, the light synthesizing unit 830 can be tilted such that the first angle is a minimum angle. The light synthesizing unit 830 can be tilted such that the first angle can be changed from the minimum angle to a maximum angle as the vehicle 100 moves (or the point to switch the direction of the vehicle is getting close) after the second graphic object is output. The second graphic object 1020 has a minimum depth value at a point where the first angle is the minimum angle, and has a maximum depth value at a point where the first angle is the maximum angle. As a result, the passenger can intuitively perceive that the point to switch the direction of the vehicle is gradually approaching. Afterwards, when the vehicle passes through the point, the second graphic object 1020 can disappear from the second display 820 and the light synthesizing unit 830 can be tilted such that the first angle has the initial setting value.

As another example, referring to FIG. 11, the light synthesizing unit 830 may be tilted such that the first angle has a predetermined angle, and the predetermined angle may depend on speed of the vehicle 100. The first angle may be near the maximum angle as a current speed increases, and may be near the minimum angle as the current speed slows down. Since the second graphic object 1120 has a larger depth value as the current speed is faster, the passenger can feel a sense of speed for the current speed in a stereoscopic manner.

As another example, referring to FIG. 12, when there is an external object having possibility of collision with the vehicle 100, the processor 860 can output object information guiding the external object on the first display 810 as a first graphic object 1210. In detail, when the possibility of collision is a first level or a distance from the external object is within a first reference distance range, the processor 860 controls the first display 810 to output the first graphic object.

At this time, a vehicle object 1230 indicating the vehicle 100 can be output together with the first graphic object 1210. The vehicle object 1230 and the first graphic object 1210 can be displayed spaced apart from each other in proportion to distances d1 to d4 between the vehicle 100 and the external object.

The processor 860 can control the second display 820 to output a second graphic object 1220 when the possibility of collision is a second level or the distance from the external object is within a second reference distance range. And, the processor 860 can control the driving unit 840 to change the first angle according to the distance from the external object or the possibility of collision with the external object.

When an object having possibility of collision is present, notification information informing the object can be provided by a first graphic object in a 2D manner or by a second graphic object in a 3D manner according to the possibility of collision. In addition, since the first angle of the light synthesizing unit varies according to the possibility of collision, the notification information can be more effectively transmitted to the passenger.

In addition, when the possibility of collision is lower than a reference value, the processor 860 can control the first and second displays 810 and 820 such that the first and second graphic objects 1210 and 1220 disappear, and control the driving unit such that the first angle has the initial setting value.

Figure 13A:
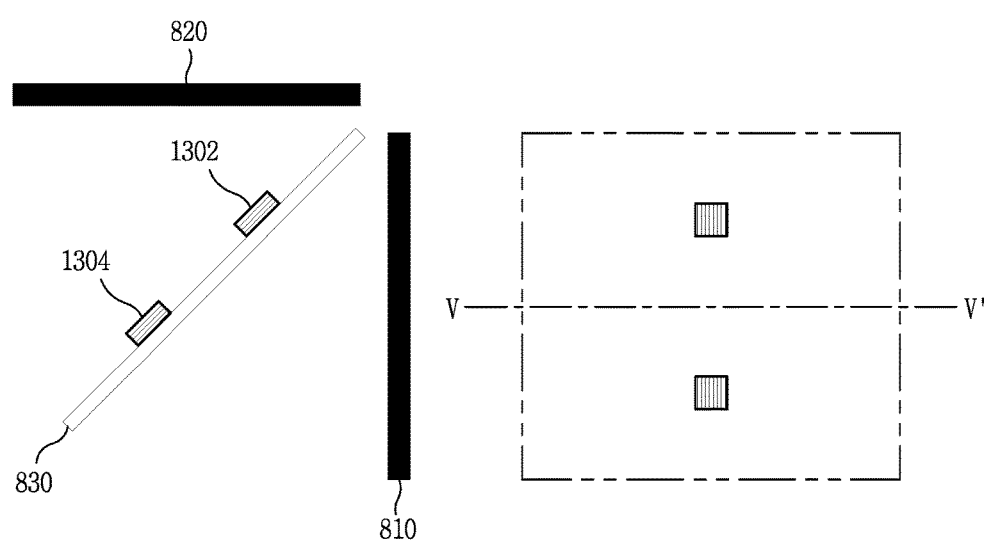
FIG. 13A is a view illustrating issues of one light synthesizing unit in accordance with an embodiment of the present invention.
Figure 13B:
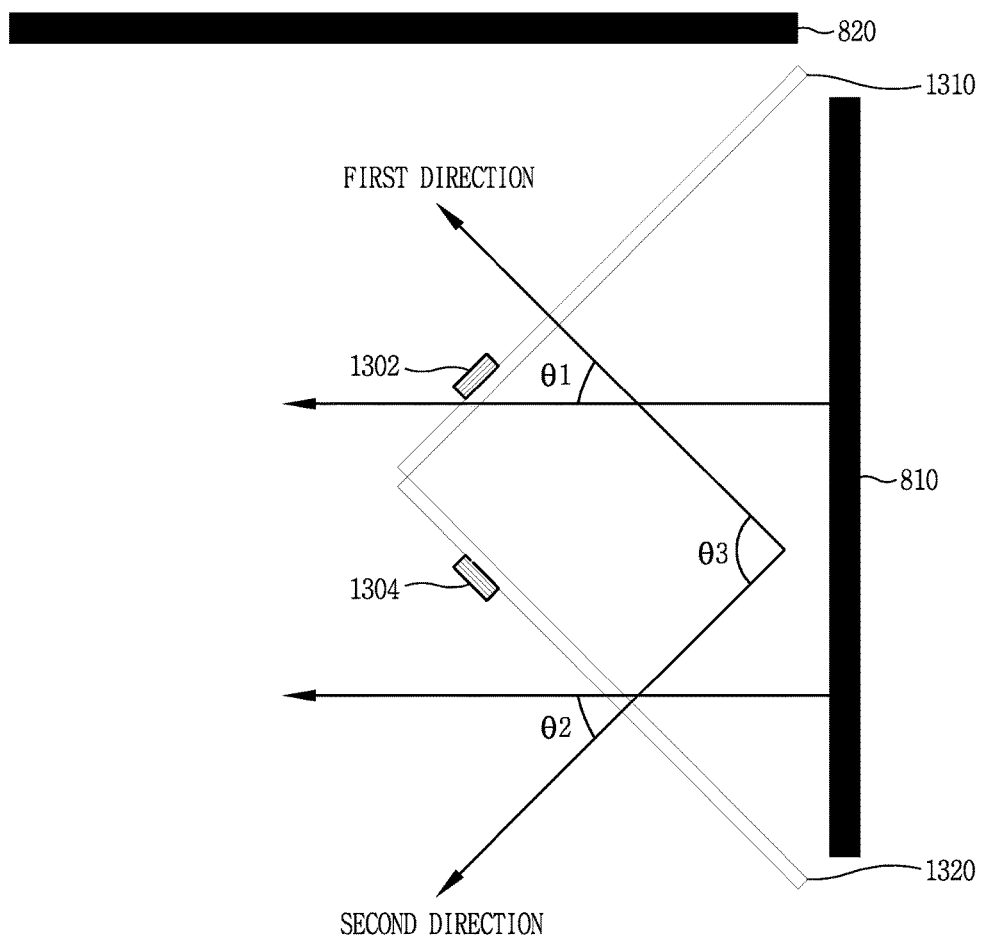
FIG. 13B is a view illustrating one embodiment of a display device for addressing the issues illustrated in FIG. 13A in accordance with an embodiment of the present invention.

FIG. 13A is a view illustrating issues or limitations of using one light synthesizing unit, and FIG. 13B is a view illustrating one embodiment of a display device for overcoming the issues or limitations illustrated in FIG. 13A.

As illustrated in FIG. 13A, since the flat light synthesizing unit 830 is located between the first and second displays 810 and 820, the distance between the light synthesizing unit 830 and the first display 810 can increase from one end to another end of the first display 810.

Due to this difference in distance, when a graphic object is displayed on the second display 820, the graphic object includes portions having different depth values. For example, when the graphic object is divided into an upper part and a lower part based on a line corresponding to a horizontal direction, the upper part has a first depth value, and the lower part has a second depth value larger than the first depth value. That is, the driver perceives that the lower part of the graphical object is closer to him/her than the upper part.

As illustrated in FIG. 13A, the first display 810 can be divided into an upper portion and a lower portion based on a line VV'. A first graphic object 1302 displayed on the upper portion has a first depth value but a second graphic object 1304 displayed on the lower portion has a second depth value, due to the distance between the light synthesizing unit 830 and the first display 810.

In outputting a specific graphic object, the processor should output the specific graphic object on the upper portion of the first display 810 to have the first depth value, and output the specific graphic object on the lower portion of the first display 810 to have the second depth value. In this manner, since a graphic object displayed on the upper portion always has a smaller depth value than a graphic object displayed on the lower portion, an output position of the graphic object is limited.

Hereinafter, to overcome the limitation, a display device 800 in which upper and lower parts of a graphic object based on the line have the same depth will be described. The display device 800 can be configured such that a first graphic object displayed on an upper portion and a second graphic object displayed on a lower portion based on a virtual line can have the same depth. In other words, the display device 800 can produce depth that is symmetric based on the line in up and down directions.

FIG. 13B is a view illustrating one embodiment of a display device 800 configured to form a sense of depth that is symmetric based on a line.

Referring to FIG. 13B, the display device 800 can include a first display 810 and a light synthesizing unit 1300.

The first display 810 is configured to output first light forming first visual information. The light synthesizing unit 1300 allows the first light to transmit therethrough and reflects second light and third light generated from different light sources.

The light synthesizing unit 1300 can include first and second light synthesizing portions 1310 and 1320. Specifically, the first light synthesizing portion 1310 is disposed so that one surface thereof faces a first direction, and is configured to transmit the first light therethrough and reflect the second light. The second light synthesizing portion 1320 is disposed to face a second direction different from the first direction, and is configured to transmit the first light therethrough and reflect the third light.

The first light synthesizing portion 1310 transmits the first light therethrough and reflects the second light such that the first light and the second light are directed to the same path, and the second light synthesizing portion 1320 transmits the first light therethrough and reflects the third light such that the first light and the third light are directed to the same path.

The first and second light synthesizing portions 1310 and 1320 correspond to independent components installed with being spaced apart from each other, but may alternatively be connected continuously to form one light synthesizing unit 1300. When configuring one light synthesizing unit 1300, one surface of the light synthesizing unit 1300 can be bent, such that a first portion of the one surface faces the first direction and a second portion faces the second direction. Hereinafter, for convenience of description, embodiments of the present invention will be described using the first and second light synthesizing portions 1310 and 1320 spaced apart from each other, but the first and second light synthesizing portions 1310 and 1320 may be replaced by the light synthesizing unit 1300.

The first light synthesizing portion 1310 is disposed so that the first direction forms a first angle θ1 with a direction that the first display 810 faces, and the second light synthesizing portion 1320 is disposed so that the second direction forms a second angle θ2 with the direction that the first display 810 faces.

The first light and the second light proceed along the same path by virtue of the first light synthesizing portion 1310, and the first light and the third light proceed along the same path by virtue of the second light synthesizing portion 1320. As a result, the first to third light can proceed along the same path.

The first direction and the second direction form an acute angle which is smaller than or equal to a right angle. For example, as illustrated in FIG. 13B, a third angle θ3 formed by the first direction and the second direction can be any angle between 80 degrees and 90 degrees. This corresponds to an optimal angle at which the second light and the third light reflected by the first and second light synthesizing portions 1310 and 1320 and the first light transmitted through at least one of the first and second light synthesizing portions 1310 and 1320 can belong to the driver's field of view.

An entire area of the first display 810 can be divided into an upper portion corresponding to the first light synthesizing portion 1310 and a lower portion corresponding to the second light synthesizing portion 1320 by a boundary line between the first and second light synthesizing portions 1310 and 1320. The boundary line corresponds to a boundary line separating the upper portion and the lower portion from each other.

The second light reflected by the first light synthesizing portion 1310 and the third light reflected by the second light synthesizing portion 1320 can be output on one display or different displays. Hereinafter, the second light and the third light will be described in more detail with reference to the accompanying drawings.

Figure 14:
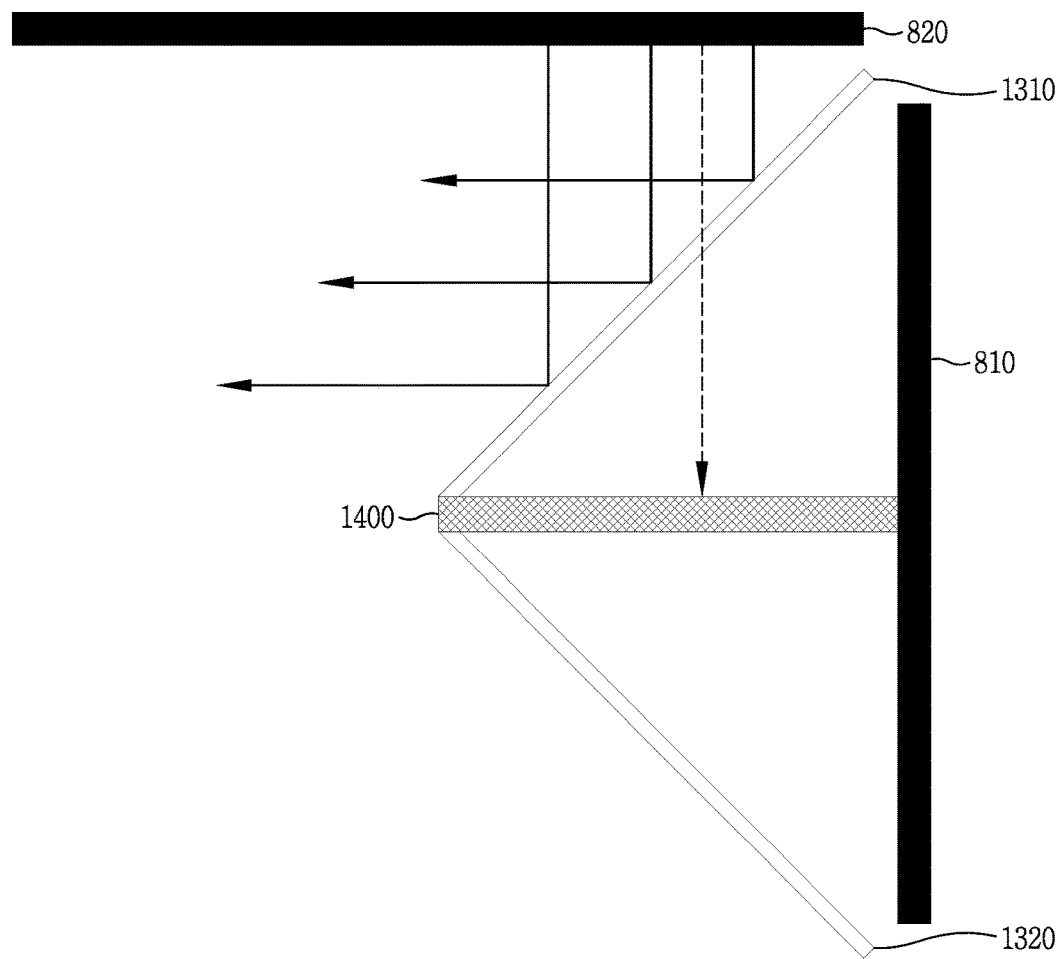
FIG. 14 is a view illustrating a structure for preventing disturbance in the display device of FIG. 13 in accordance with an embodiment of the present invention.

FIG. 14 is a view illustrating a structure for preventing disturbance in the display device 800 of FIG. 13B.

Referring to FIG. 14, the first and second displays 810 and 820 are arranged to have a preset angle therebetween, and the first light synthesizing portion 1310 can be interposed between the first and second displays 810 and 820. In this situation, the second display 820 may output the second light toward the first light synthesizing portion 1310.

Most of the second light which is output from the second display 820 toward the first light synthesizing portion 1310 is reflected by the first light synthesizing portion 1310 to proceed along the same path as the first light. A part of the second light, although it is a tiny amount of the second light, may pass through the first light synthesizing portion 1310 or may be directed to the second light synthesizing portion 1320 due to diffused reflection.

When the second light is directed to the second light synthesizing portion 1320, the second light synthesizing portion 1320 can affect at least one of the first light and the third light directed to the same path. Accordingly, visibility and/or readability of visual information formed by at least one of the first light and the third light may fail to reach a criterion (standard). Also, an unintentional virtual image in the display device 800 can be formed on the second light synthesizing portion 1320.

To solve this problem, the display device 800 can include a light absorbing unit 1400 disposed between the first light synthesizing portion 1310 and the second light synthesizing portion 1320, and configured to absorb at least one of the second light and the third light.

Here, absorbing light refers to light reaching the light absorbing unit 1400 that is not reflected to a predetermined ratio or less. For example, both surfaces of the light absorbing unit 1400 can be coated with a light absorbing material having reflectance of 1% or less, or can be coated with a dye having a predetermined color.

The light absorbing unit 1400 blocks the second light from proceeding to the second light synthesizing portion 1320 and blocks the third light from proceeding to the first light synthesizing portion 1310.

The light absorbing unit 1400 can be disposed orthogonal to the first display 810 and one end of the light absorbing unit 1400 can be connected to the first display 810. When the first display 810 and the light absorbing unit 1400 are spaced apart from each other, the first light output from the first display 810 can enter the space due to diffused reflection. In this situation, since the first light may be disturbance to the display device 800, one end of the light absorbing unit 1400 is connected to the first display 810.

Hereinafter, various embodiments of the structure for outputting the second light and the third light will be described in detail.

Figure 15A:
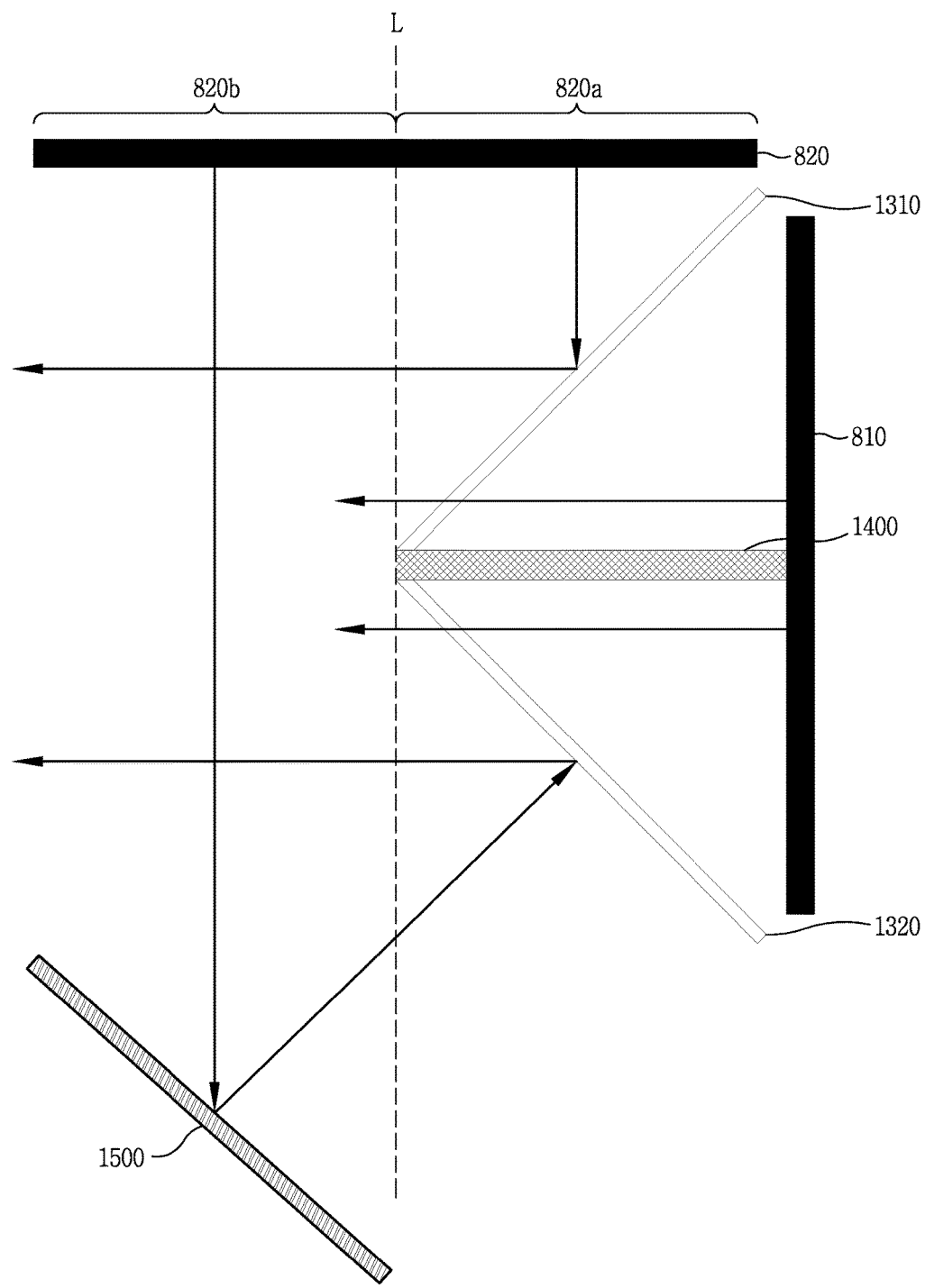
FIGS. 15A and 15B are views illustrating a method of outputting three-dimensional information using one display in accordance with an embodiment of the present invention.
Figure 15B:
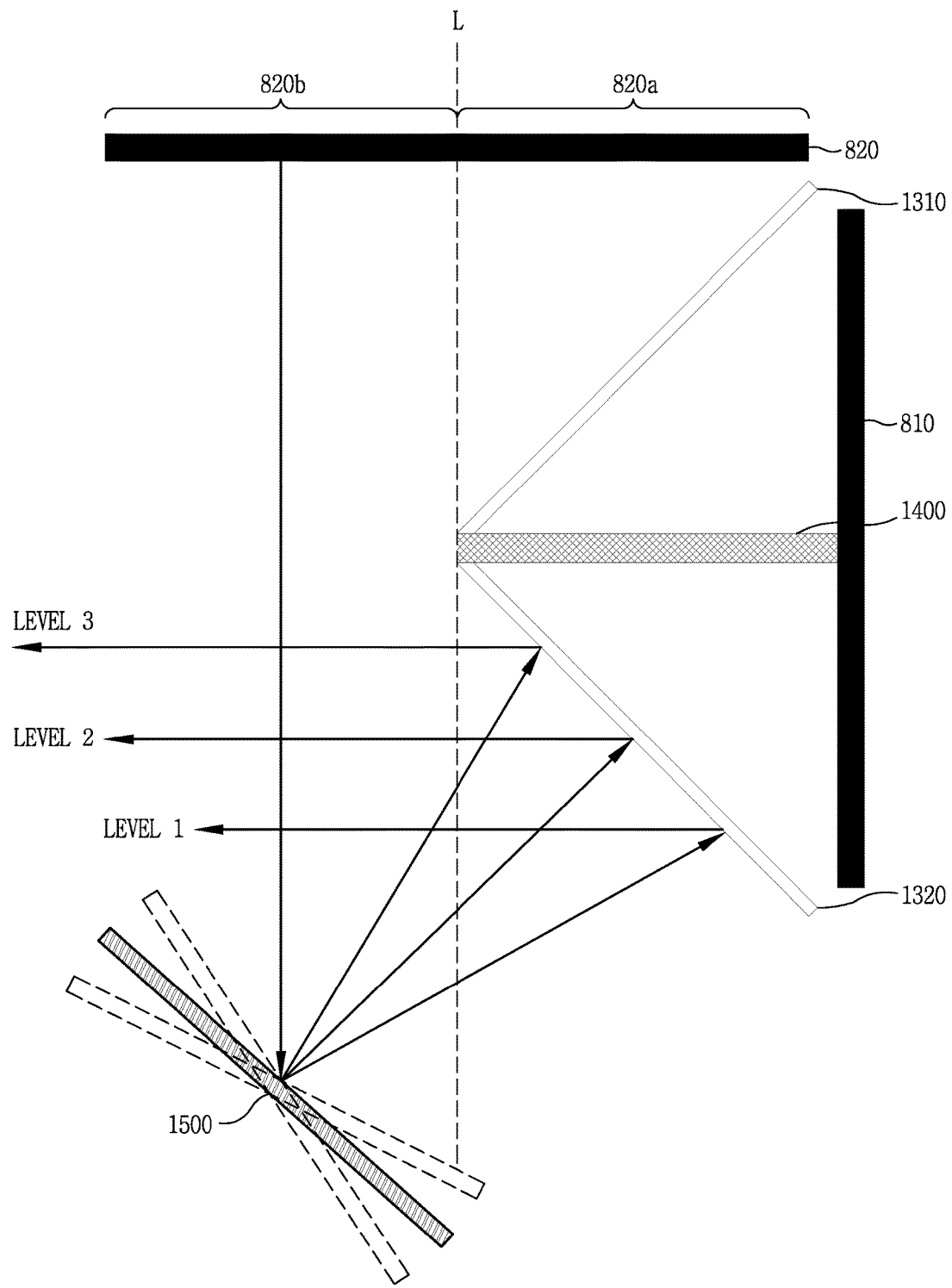

FIGS. 15A and 15B are views illustrating a method of outputting 3D information using one display.

As illustrated in FIG. 15A, the display device 800 can further include a reflection unit 1500.

The second display 820 can be divided based on a reference line L into a first portion 820a that outputs the second light to the first light synthesizing portion 1310 and a second portion 820b that outputs the third light to the reflection unit 1500.

The reflection unit 1500 reflects light so that a part of the light output from the second display 820 is directed to the second light synthesizing portion 1320. In other words, the reflection unit 1500 is configured to reflect the third light output from the second part 820b so that the third light is directed to the second light synthesizing portion 1320.

In the display device 800 according to the present invention, the first display 810 provides a 2D screen, and the second display 810 provides a 3D screen which overlaps the 2D screen. One point of the 3D screen has depth by a distance between the first and second light synthesizing portions 1310 and 1320 and the first display 810.

The first and second displays 810 and 820 can have display areas of the same size and shape so that the 2D screen and the 3D screen completely overlap each other.

Information output from the first portion 820a is formed by the second light, and is reflected by the first light synthesizing portion 1310 to be directed to the same path as the first light.

Information output from the second portion 820b is formed by the third light. The information is reflected by the reflection unit 1500 and then reflected by the second light synthesizing portion 1320 again to be directed to the same path as the first light.

Since the information output from the second portion 820b is inverted by the reflector 1500 upside down, the processor 860 controls the second display 820 such that the information output from the second portion 820b is inverted upside down.

The display device 800 can provide 3D information using the first and second light synthesizing portions 1310 and 1320 in such a manner that depth of the 3D information is vertically symmetric using the reflection unit 1500.

Referring to FIG. 15B, the reflection unit 1500 can be tiltable to vary the path of the third light. The processor 860 can control the driving unit to tilt the reflection unit 1500 such that the path of the third light is changed.

Even though the same information is output in the same position and size in the second portion 820b, the same information is displayed at a different position on the first display 810 and has different depth due to the tilting of the reflection unit 1500.

The processor 860 can control the driving unit to vary an angle between the reflection unit 1500 and the first display 810 according to speed of the vehicle 100.

For example, when the speed of the vehicle 100 is within a first range, the processor 860 can control the driving unit such that an associated notification icon is displayed at a position of Level 1. When the speed of the vehicle 100 is changed into a second range from the first range, the reflection unit 1500 is tilted and accordingly the notification icon is moved from the position of Level 1 to a position of Level 2. As the output position of the notification icon moves from Level 1 to Level 3, a 3D depth of the notification icon is changed, so that the notification can be more effectively provided.

The display device 800 according to the present invention can divide the second display 820 into the first portion 820a and the second portion 820b, and output the first graphic object on the first portion 820a and the second graphic object on the second portion 820b. The first graphic object has a first depth value by the first light synthesizing portion 1310 and the second graphic object has a second depth value by the second light synthesizing portion 1310. At this time, the display device 800 may adjust the respective output positions of the first and second graphic objects to have the same depth value. Accordingly, different graphic objects having the same depth value can be displayed at top and bottom of the first display 810, respectively.

Figure 16A:
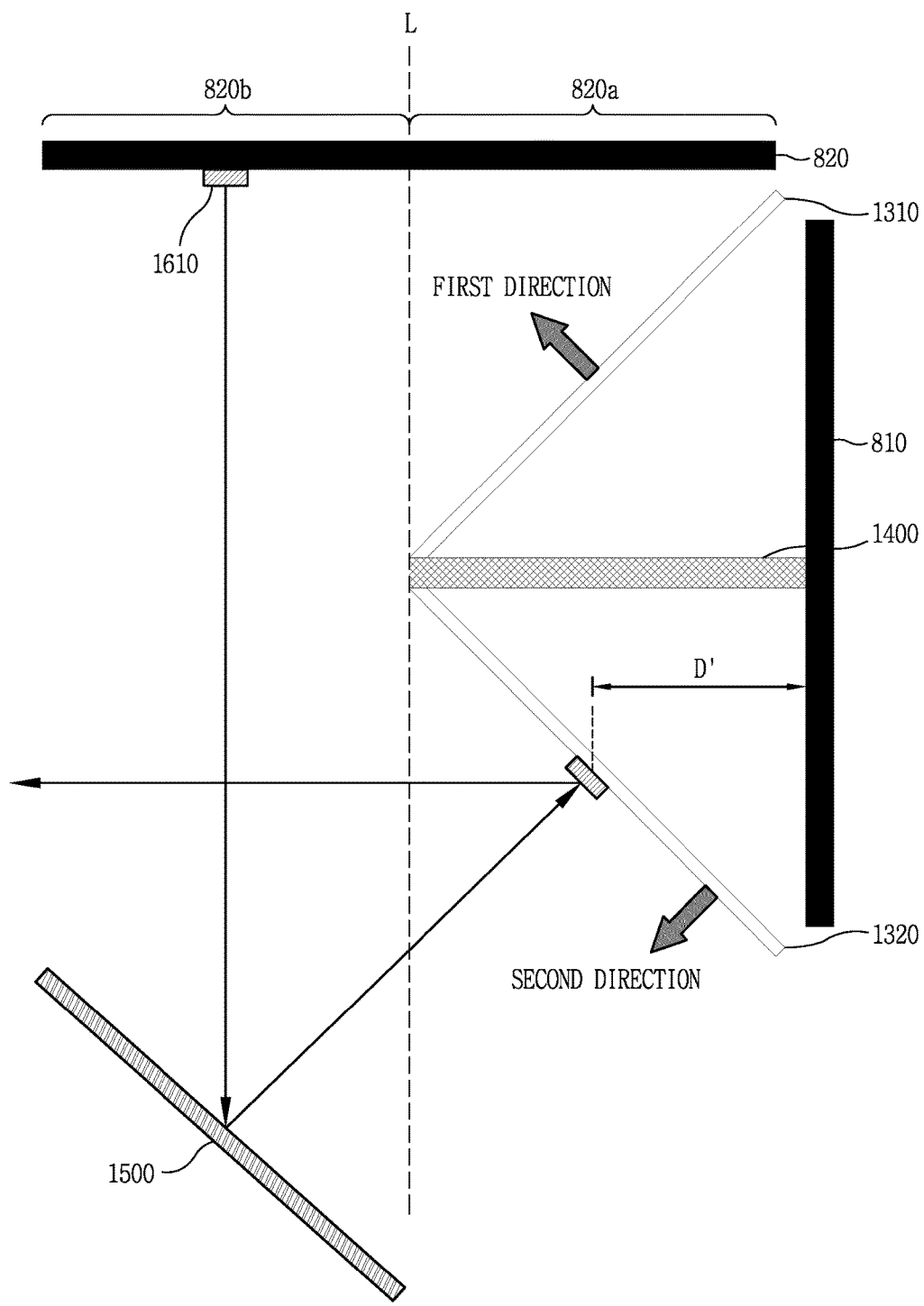
FIGS. 16A to 16C are views illustrating a structure for tilting at least one light synthesizing unit in accordance with an embodiment of the present invention.
Figure 16B:
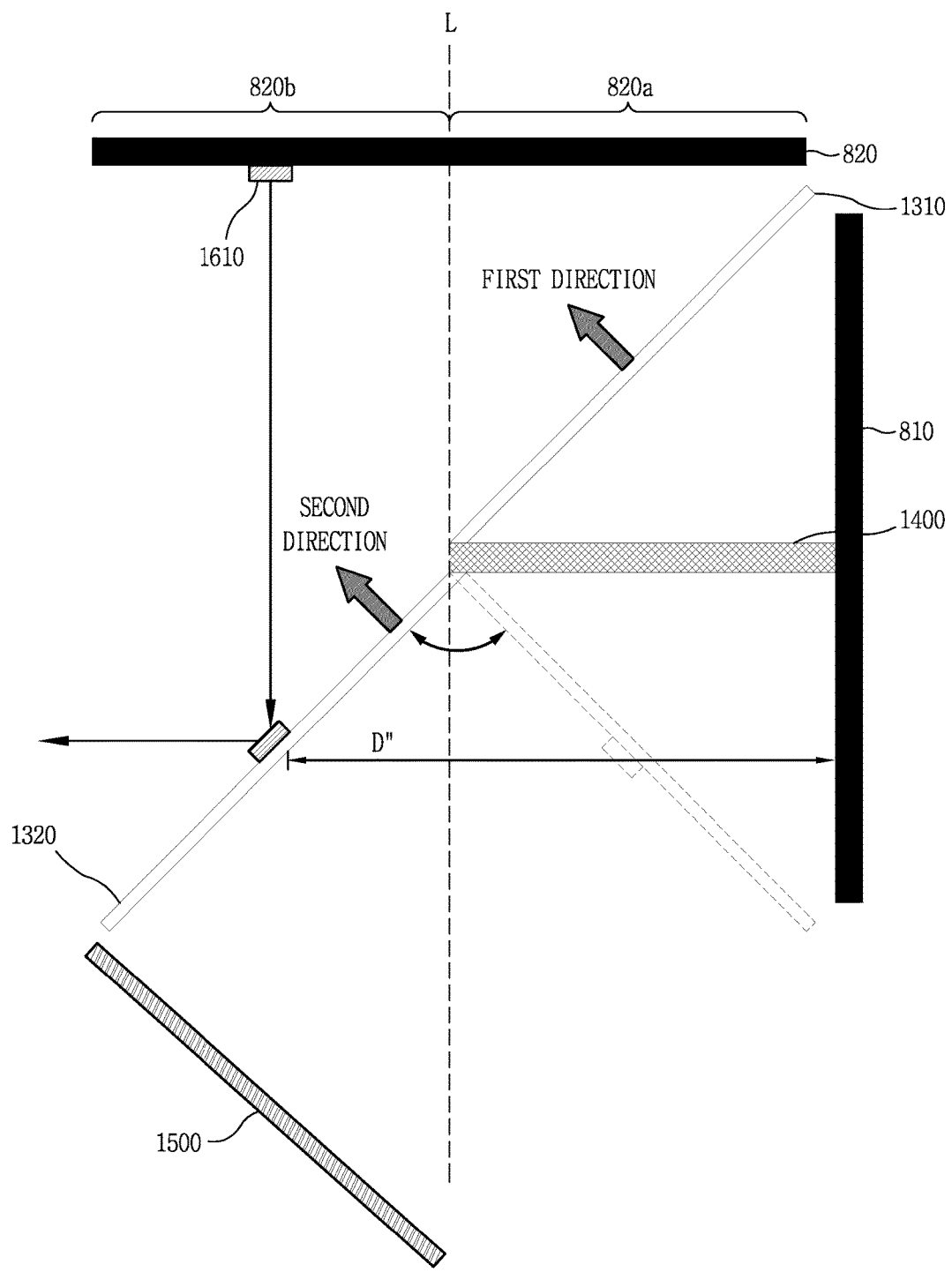
Figure 16C:
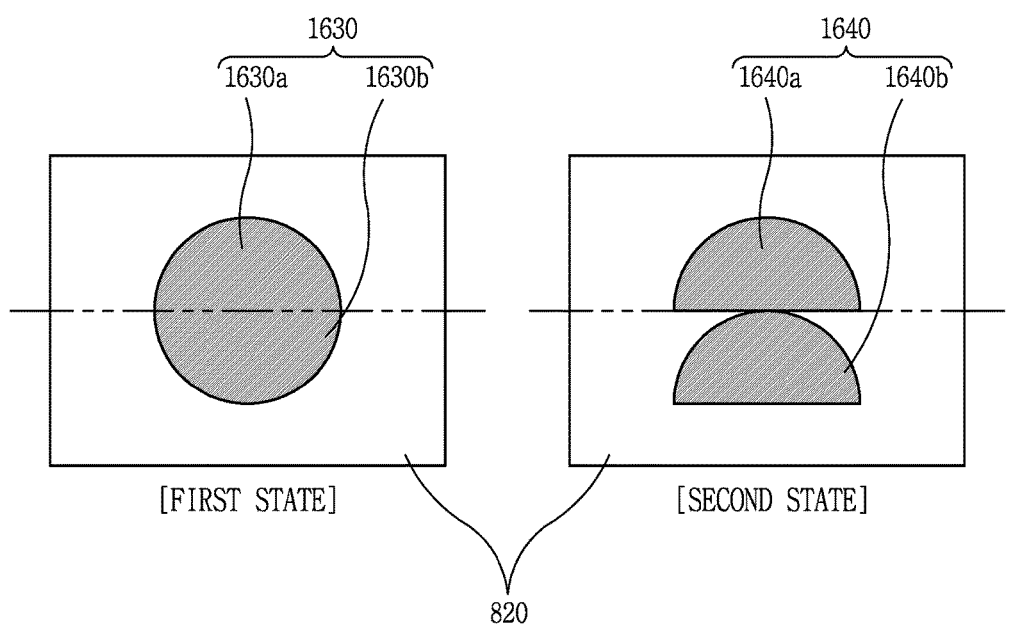

FIGS. 16A to 16C are views illustrating a structure of tilting at least one light synthesizing unit.

An example in which a graphic object 1610 is output on the second portion 820b is illustrated in FIGS. 16A and 16B. The graphic object 1610 cannot have a physical shape, but is illustrated as having a predetermined shape for convenience of explanation.

As illustrated in FIG. 16A, the graphic object 1610 output from the second display 820 is reflected by the reflection unit 1500 and then reflected by the second light synthesizing portion 1320 again to be displayed on the second light synthesizing portion 1320. Also, the graphic object 1610 has a first depth value D'.

The second light synthesizing portion 1320 can be disposed to face the second direction and be tiltable such that the second direction varies. In detail, the display device 800 can further include a driving unit having a rotation shaft supplying power (driving force). The second light synthesizing portion 1320 can be coupled to the rotation shaft to be tiltable.

For example, as illustrated in FIG. 16B, one end of the second light synthesizing portion 820 may be fixed and another end may be rotatable by an external force provided by the driving unit. Accordingly, the second direction varies, and a third angle θ3 formed by the second direction with respect to the first direction that one surface of the first light synthesizing portion 810 faces is changed.

For convenience of explanation, a state where the first direction and the second direction are located within a first angular range as illustrated in FIG. 16A is defined as a 'first state', and a state where the first direction and the second direction are located within a second angular range as illustrated in FIG. 16B is defined as a "second state."

Even when the graphic object 1610 having the same size is output at the same position of the second portion 820b, the graphic object 1610 may have a different depth value depending on whether it is in the first state or the second state. For example, as illustrated in FIG. 16A, the graphic object 1610 has a first depth value D' in the first state, whereas, as illustrated in FIG. 16B, the graphic object 1610 may have a second depth value D" in the second state. A distance between the point where the light output on the second portion 820b is reflected by the second light synthesizing portion 1320 and the first display 810 is changed according to the second direction.

The information output on the second portion 820b has a value within a first depth value range in the first state. On the other hand, the information output on the second portion 820b in the second state has a value within a second depth value range that does not overlap the first depth value range.

In this way, the processor 860 can control the driving unit to tilt the second light synthesizing portion 1320 to adjust a depth value of the information output on the second portion 820b.

For example, when outputting turn-by-turn (TBT) information in which a specific point is set, the processor 860 can control the driving unit such that the second state is activated. The turn-by-turn information may initially be displayed on one end of the second display 820 and gradually move to another end of the second display 820 as the vehicle 100 approaches the specific point. In other words, the turn-by-turn information may be displayed on the first portion 820a and then moved to the second portion 820b. In this situation, the turn-by-turn information is reflected by the first light synthesizing portion 1310 and then reflected by the second light synthesizing portion 1320 again, to have a gradually deeper 3D depth value.

As another example, when outputting predetermined information whose upper and lower sides should have the same depth value, the processor 860 may control the driving unit such that the first state is activated. In the first state, the predetermined information may have a depth value that is vertically symmetric by the first and second light synthesizing portions 1310 and 1320.

The processor 860 determines information to be output based on the vehicle driving information, and controls the driving unit such that the first state or the second state is activated based on the determined information. As the determined information is displayed on the second display 820, the decided information has a predetermined depth value by virtue of the first and second light synthesizing portions 1310 and 1320. The predetermined depth value varies depending on the state of the second light synthesizing portion 1320 (the first state or the second state).

In addition, in the first state, the information output on the second portion 820b is reflected by the reflection unit 1500 to reach the second light synthesizing portion 1320. The information output on the second portion 820b is inverted upside down by the reflection unit 1500 and then reaches the user.

In the second state, the information output from the second portion 820b directly reaches the second light synthesizing portion 1320, not the reflection unit 1500, and is not inverted upside down.

As such, the upside-down inversion of the information output from the second portion 820b may or may not occur according to the second direction.

The processor 860 can control the second display 820 to change at least one of an output position and an output direction of information output from the second portion based on a direction (or the second direction) that the one surface of the second light synthesizing portion 1320 faces.

For example, as illustrated in FIG. 16C, when graphic objects 1630 and 1640 are displayed on the second display 820, portions 1630a and 1640a of the graphic objects can be displayed on the first portion 820a, and the remaining portions 1630b and 1640b of the graphic objects can be displayed on the second portion 820b.

Since the upside-down inversion is not performed in the first state, the graphic object 1630 is displayed as it is. On the other hand, a portion of the graphic object displayed on the second portion 820b in the second state is inverted upside down.

In the second state, the processor 860 can divide the graphic object 1640 into a first display portion 1640a and a second display portion 1640a, depending on displayed positions on the first and second portions 820a and 820b. The processor 860 controls the second display 820 such that the second display portion 1640b is displayed in such a manner being inverted upside down.

Since the second display portion 1640b, which has been displayed in the upside-down inverted state, is inverted upside down again by the second light synthesizing portion 1320, the user can be provided with the graphic object having the same shape not only in the first state but also in the second state.

In addition, even when a main execution screen is output on the second display 820 due to an event generation, an upside-down inversion of a partial screen can be performed. In this situation, the main execution screen is divided into first and second sub execution screens on the basis of the first and second parts 820a and 820b, and the first sub execution screen is output on the first part 820a, and the second sub execution screen is output on the second portion 820b in an upside-down inverted state.

The main execution screen can be received through the communication unit 850 from at least one processor provided in the vehicle. The main execution screen may be a screen providing an application installed in the vehicle 100, a screen received wirelessly from an external server or an external terminal, or a screen provided by at least one processor among various electric components provided in the vehicle.

As described above, the second light reflected by the first light synthesizing portion 1310 and the third light reflected by the second light synthesizing portion 1320 can be output from the one display 820.

Although a product size may increase due to the second display 820 and the reflection unit 1500, the second display 820 can serve as a shielding film for blocking external light introduced into the first display 810. The display device 800 can also adjust depth of a graphic object formed on the second light synthesizing portion 1320 by tilting the reflection unit 1500, and can provide an optimized user interface according to a vehicle driving situation using the tilting of the second light synthesizing portion 1320.

In addition, the second light reflected by the first light synthesizing portion 1310 and the third light reflected by the second light synthesizing portion 1320 can also be output from different displays. Hereinafter, an embodiment in which the second light and the third light are output using different displays will be described.

Figure 17A:
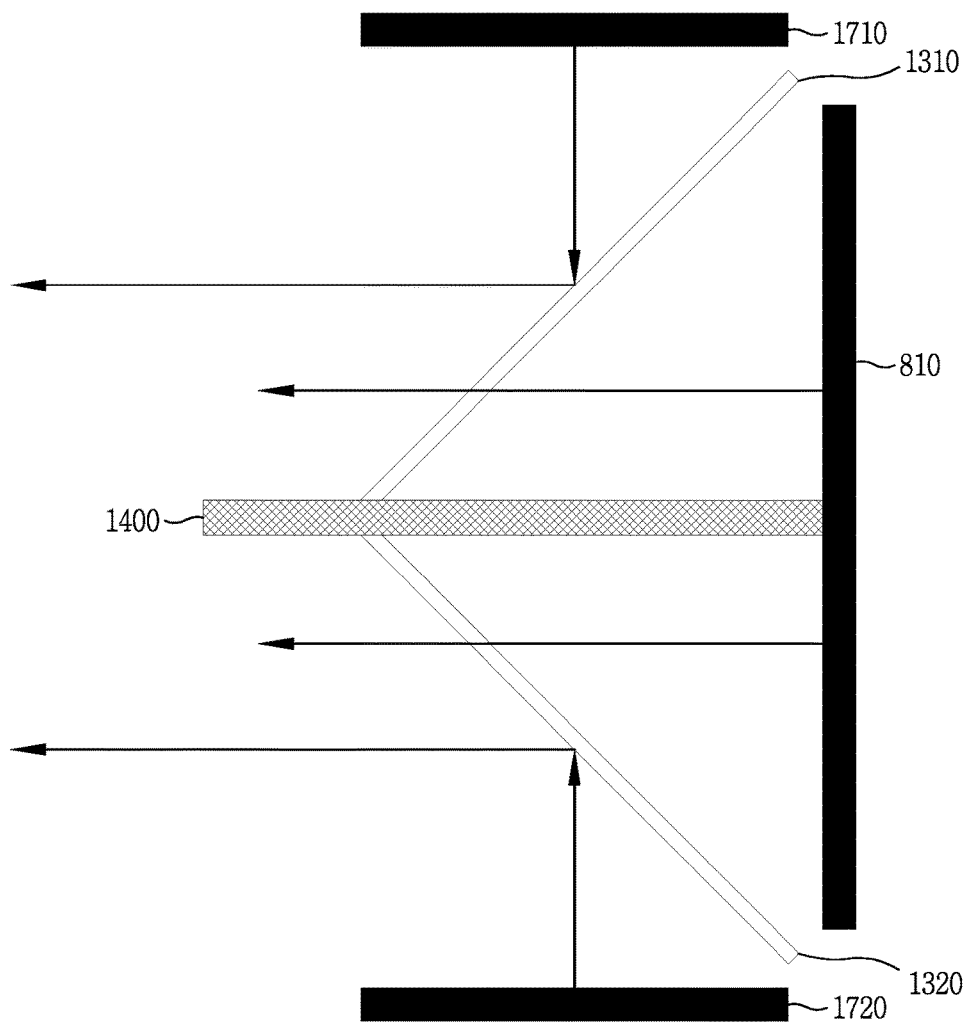
FIGS. 17A and 17B are views illustrating a method of outputting three-dimensional information using a plurality of displays in accordance with an embodiment of the present invention.
Figure 17B:
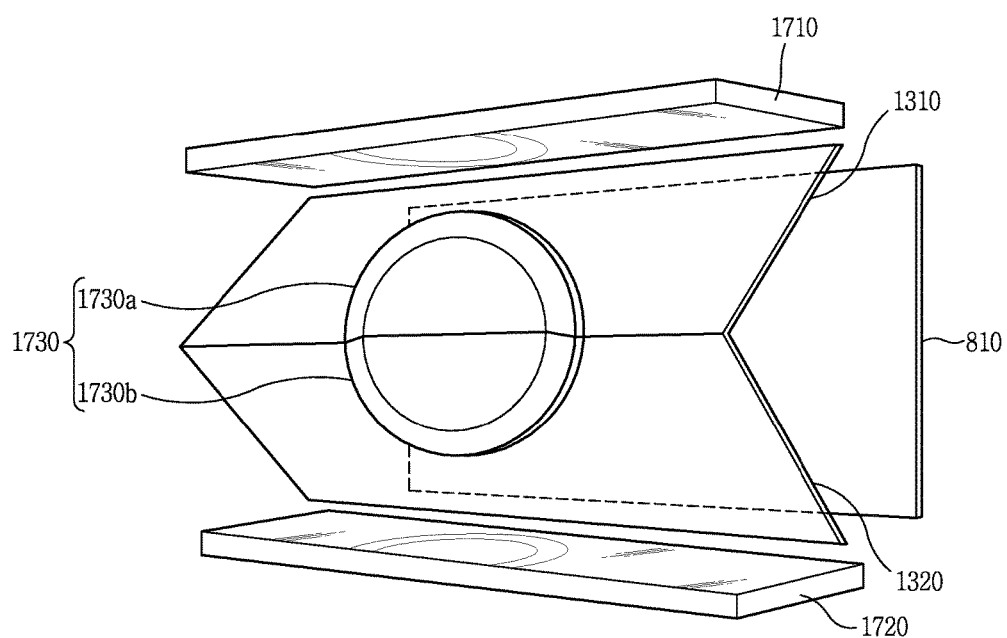

FIGS. 17A and 17B are views illustrating a method of outputting 3D information using a plurality of displays.

Referring to FIG. 17A, the display device 800 can include a second display 1710 configured to output the second light toward one surface of the first light synthesizing portion 1310, and a third display 1720 configured to output the third light toward one surface of the second light synthesizing portion 1320.

The second display 1710 and the third display 1720 can be spaced apart from each other in a direction facing each other.

As illustrated in FIG. 17B, a graphic object 1730 having a 3D depth value can be displayed by the first and second light synthesizing portions 1310 and 1320.

The processor 860 can divide the graphic object 1730 into a first part 1730a to be displayed on the second display 1720, and a second part 1730b to be displayed on the third display 1730, considering at least one of size and position of the graphic object 1730. The first part 1730a is output from the second display 1710 and displayed on the first light synthesizing portion 1310, and the second part 1730b is output from the third display 1720 and displayed on the second light synthesizing portion 1320.

Unlike the drawing, when the graphic object 1730 overlaps only an upper portion of the first display 810, the graphic object 1730 is not divided into the first and second parts 1730a and 1730b but entirely displayed on the second display 1710.

As such, the processor 860 can select at least one of the second and third displays 1710 and 1720 in consideration of size and position of a graphic object to be displayed, and display at least part of the graphic object on the selected at least one display.

When the plurality of displays 1710 and 1720 are used, the device size can be smaller than that using one display 820. Specifically, the depth of the display device is reduced since one display is changed to two displays, and the height of the display device is reduced because the reflection unit may be excluded.

As described above, the display device 800 according to the present invention can include the first and second light synthesizing portions 1310 and 1320, and provide information in a 3D manner using the second light reflected from the first light synthesizing portion 1310 and the third light reflected from the second light synthesizing portion. The second light and the third light may be provided from the one display 820 or may be provided from the plurality of displays 1710 and 1720, respectively, which are spaced apart from each other.

In addition, the second light or the third light may be provided from a separate device. For example, a mobile terminal having a touch screen may provide the second light or the third light to the display device 800.

Figure 18:
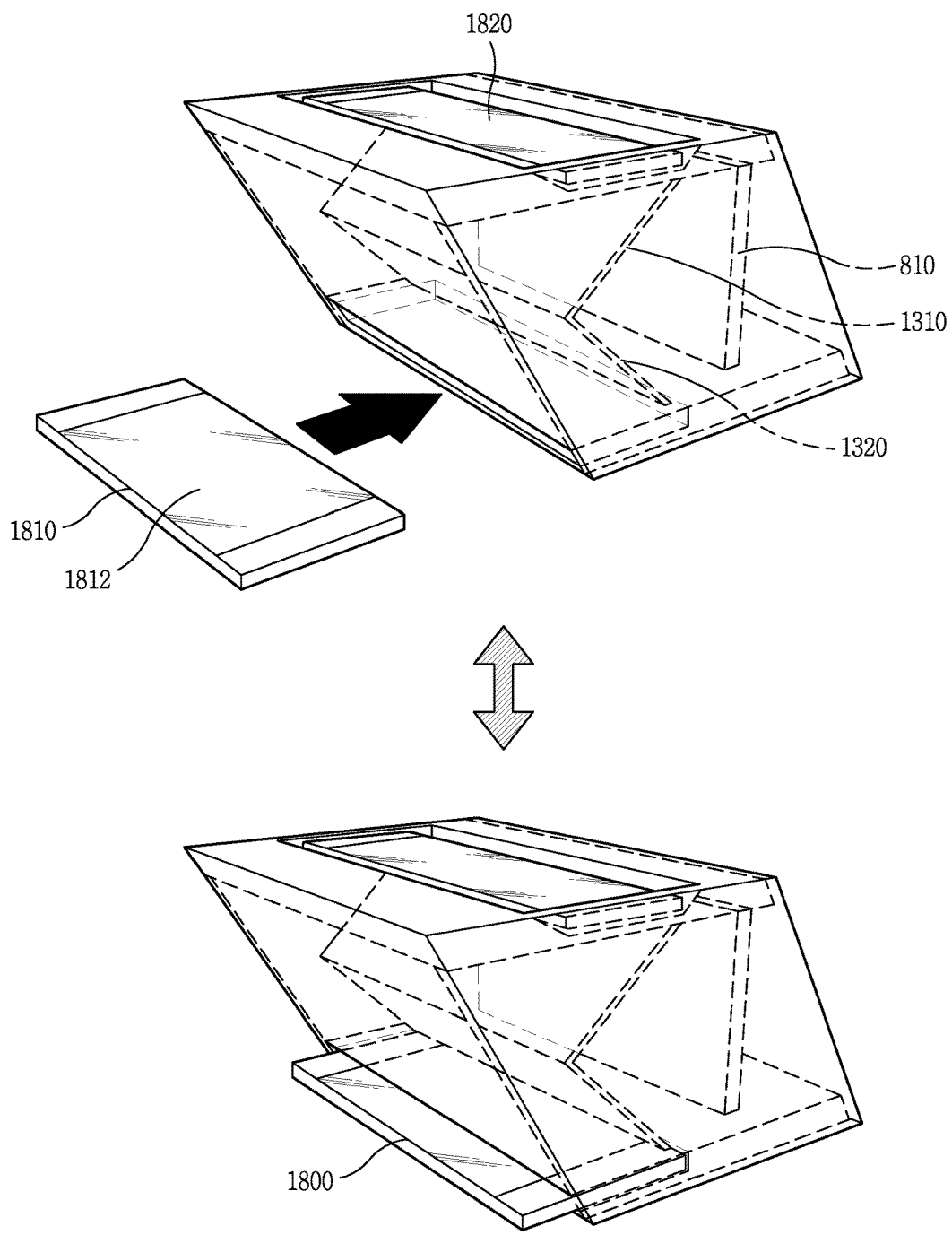
FIG. 18 is a view illustrating a method of outputting three-dimensional information using a mobile terminal in accordance with an embodiment of the present invention.

FIG. 18 is a view illustrating a method of outputting 3D information using a mobile terminal.

As illustrated in FIG. 18, a mobile terminal 1810 having a touch screen 1812 may be inserted into the display device 800. When the mobile terminal 1810 is inserted, the touch screen 1812 faces the second light synthesizing portion 1320 and provides the third light to the second light synthesizing portion 1320.

The processor 860 can determine whether the mobile terminal 1810 is inserted using a sensor, and can perform communication with the mobile terminal 1810 to provide the third light when the mobile terminal 1810 is inserted. The processor 860 determines information to be displayed on the second light synthesizing portion 1320 according to the vehicle driving information and performs communication with the mobile terminal 1810 so that the determined information is output through the touch screen 1812.

In addition, one surface of the display device 800 may be provided thereon with a transparent support portion 1820 that may support the mobile terminal 1810. When the mobile terminal 1810 is placed on the transparent support portion 1820 such that the touch screen 1812 faces the first light synthesizing portion 1310, the touch screen 1812 provides the second light to the first light synthesizing portion 1310. In this situation, the processor 860 may perform communication with the mobile terminal 1810 such that predetermined information is displayed on the first light synthesizing portion 1310.

In addition, at least one of the first and second light synthesizing portions can be configured such that transmittance thereof is varied according to a preset condition.

For example, the first light synthesizing portion transmits first light output from the first display 810 and reflects the second light output from the second display 820 such that the first light and the second light are directed to the same path.

When the transmittance of the first light synthesizing portion is varied, an amount of the first light transmitted through the first light synthesizing portion can be varied, but an amount of the second light reflected by the first light synthesizing portion may be kept constant. In this situation, although sharpness of the second graphic object formed by the second light is maintained as it is, sharpness of the first graphic object formed by the first light is varied.

The processor 860 can blur the first graphic object output by the first display 810 by adjusting the transmittance of the first light synthesizing portion. In other words, since the first graphic object may be changed to an out-of-focus state according to the transmittance of the first light synthesizing portion but the second graphic object output by the second display 820 is displayed as it is, a depth of field may be lowered. An effect of viewing the display device using a telephoto lens is generated, so that a concentration of passengers on the second graphic object can be induced.

Whether or not the preset condition is satisfied may depend on the vehicle driving information. For example, the transmittance of at least one of the first and second light synthesizing portions can vary depending on speed of the vehicle 100. As the speed increases, the transmittance is controlled to be lowered, thereby inducing the driver to lower the speed.

The operation of the display device 800 of the present invention described above with reference to FIGS. 8A to 18 can extend up to the vehicle 100 provided with the display device 800.

The present invention can be implemented as computer-readable codes (applications or software) in a programrecorded medium. The method of controlling the autonomous vehicle can be realized by a code stored in a memory or the like.

The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer can include the processor or the controller. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A display device provided in a vehicle and configured to perform communication with at least one processor provided in the vehicle, the display device comprising:
   a first display configured to output first light forming first visual information; and
   a light synthesizing unit configured to pass the first light through the light synthesizing unit, and reflect second light and third light generated by different light sources,
   wherein the light synthesizing unit comprises:
   a first light synthesizing portion disposed with a first surface of the first light synthesizing portion facing a first direction, and the first light synthesizing portion is configured to pass the first light through the first light synthesizing portion and reflect the second light; and
   a second light synthesizing portion disposed with a second surface of the second light synthesizing portion facing a second direction different from the first direction, and the second light synthesizing portion is configured to pass the first light through the second light synthesizing portion and reflect the third light.

2. The device of claim 1, further comprising a docketing area configured to receive a mobile device for generating the different light sources.

3. The device of claim 1, wherein the first light synthesizing portion is arranged with the first direction forming an acute angle between the first direction and the first display, and
   wherein the second light synthesizing portion is arranged with the second direction forming an acute angle between the second direction and the second display.

4. The device of claim 3, wherein the first direction and the second direction form an angle less than or equal to 90 degrees.

5. The device of claim 1, further comprising a light absorbing unit disposed between the first light synthesizing portion and the second light synthesizing portion and the light absorbing unit is configured to absorb at least one of the second light and the third light.

6. The device of claim 5, wherein the light absorbing unit is configured to block the second light from proceeding to the second light synthesizing portion and block the third light from proceeding to the first light synthesizing portion.

7. The device of claim 5, wherein the light absorbing unit is arranged orthogonal to the first display, and one end of the light absorbing unit is connected to the first display.

8. The device of claim 1, further comprising a second display spaced apart from the first display with a predetermined angle between the first display and the second display,
   wherein the second display includes a first portion configured to output the second light and a second portion configured to output the third light.

9. The device of claim 8, further comprising a reflection unit configured to reflect the third light output from the second portion of the second display and direct the third light to the second light synthesizing portion.

10. The device of claim 9, wherein the reflection unit is configured to tilt and vary a path of the third light based on the tilt of the reflection unit.

11. The device of claim 10, wherein a second angle between the reflection unit and the first display varies based on a speed of the vehicle.

12. The device of claim 9, wherein the second light synthesizing portion is configured to tilt and the second direction in which the second surface of second light synthesizing portion faces is adjusted based on the tilt of the second light synthesizing potion.

13. The device of claim 12, wherein second light synthesizing portion is configured to vary at least one of an output position and an output direction of information output from the second portion according to the second direction in which the second surface of the second light synthesizing portion faces.

14. The device of claim 9, wherein the second display is configured to:
   display a main execution screen, and
   in response to an occurrence of an event generation, divide the main execution screen into a first sub execution screen and a second sub execution screen,
   wherein the first sub execution screen is output on the first portion of the second display in a first manner, and the second sub execution screen is output on the second portion in an inverted manner relative to the first manner.

15. The device of claim 14, further comprising a communication unit configured to receive the main execution screen from the at least one processor provided in the vehicle.

16. The device of claim 1, further comprising:
   a second display configured to output the second light toward the first surface of the first light synthesizing portion; and
   a third display configured to output the third light toward the second surface of the second light synthesizing portion.

17. The device of claim 16, wherein the second display is spaced apart from and faces toward the third display.

18. The device of claim 1, wherein the first light synthesizing portion is configured to pass the first light through the first light synthesizing portion and reflect the second light in a same direction as the first light output by the first display, and
   wherein the second light synthesizing portion is configured to pass the first light through the second light synthesizing portion and reflect the third light in the same direction as the first light output by the first display.

19. The device of claim 1, wherein at least one of the first and second light synthesizing portions is configured to vary a transmittance property according to a preset condition.

20. A display device for installation in a vehicle, the display device comprising:

a first display configured to output first light forming first visual information;

a light synthesizing unit configured to pass the first light through the light synthesizing unit, and reflect second light and third light generated by different light sources; and a docking area configured to receive a mobile device for generating the different light sources, wherein the light synthesizing unit comprises:

a first light synthesizing portion having a first surface facing a first direction, and the first light synthesizing portion being configured to pass the first light through the first light synthesizing portion and reflect the second light; and a second light synthesizing portion having a second surface facing a second direction different from the first direction, and the second light synthesizing portion being configured to pass the first light through the second light synthesizing portion and reflect the third light, wherein the first light synthesizing portion is configured to tilt, and the first direction in which the first surface of first light synthesizing portion faces is adjusted to vary a direction of the second light reflected by the first light synthesizing portion based on the tilt of the second light synthesizing potion, wherein the second light synthesizing portion is configured to tilt, and the third direction in which the second surface of second light synthesizing portion faces is adjusted to vary a direction of the third light reflected by the second light synthesizing portion based on the tilt of the second light synthesizing potion, and wherein at least a portion of the first light overlaps with the second light or the third light to provide a three dimensional (3D) image.

* * * * *